(12) United States Patent
Green et al.

(10) Patent No.: US 9,240,749 B2
(45) Date of Patent: Jan. 19, 2016

(54) MOTOR DRIVE CONTROL USING PULSE-WIDTH MODULATION PULSE SKIPPING

(71) Applicant: Emerson Climate Technologies, Inc., Sidney, OH (US)

(72) Inventors: Charles E. Green, Fenton, MO (US); Joseph G. Marcinkiewicz, St. Peters, MO (US)

(73) Assignee: Emerson Climate Technologies, Inc., Sidney, OH (US)

( * ) Notice: Subject to any disclaimer, the term of this patent is extended or adjusted under 35 U.S.C. 154(b) by 102 days.

(21) Appl. No.: 13/963,317

(22) Filed: Aug. 9, 2013

(65) Prior Publication Data

US 2014/0042948 A1 Feb. 13, 2014

Related U.S. Application Data

(60) Provisional application No. 61/755,230, filed on Jan. 22, 2013, provisional application No. 61/729,229, filed on Nov. 21, 2012, provisional application No. 61/697,079, filed on Sep. 5, 2012, provisional application No. 61/682,149, filed on Aug. 10, 2012.

(51) Int. Cl.
*H02P 1/30* (2006.01)
*H02P 1/52* (2006.01)
(Continued)

(52) U.S. Cl.
CPC .............. *H02P 27/04* (2013.01); *H02P 21/146* (2013.01); *H02P 21/148* (2013.01); *H02P 27/085* (2013.01); *H02P 2201/15* (2013.01); *H02P 2205/05* (2013.01); *H02P 2205/07* (2013.01)

(58) Field of Classification Search
CPC ...................... H02M 2001/0032; H02M 2/156
USPC ......................................................... 318/503
See application file for complete search history.

(56) References Cited

U.S. PATENT DOCUMENTS

| 4,364,237 A | 12/1982 | Cooper et al. |
| 4,370,564 A | 1/1983 | Matsushita |

(Continued)

FOREIGN PATENT DOCUMENTS

| CN | 1240058 A | 12/1999 |
| CN | 1293885 A | 5/2001 |

(Continued)

OTHER PUBLICATIONS

"2nd Generation of PFC Solutions," Michael Frisch, Temesi Erno, Yu Jinghui, Tyco Electronics/Power Systems, Sep. 2004.
(Continued)

*Primary Examiner* — Erick Glass
(74) *Attorney, Agent, or Firm* — Harness, Dickey & Pierce, P.L.C.

(57) ABSTRACT

A control system for a motor includes a pulse-width modulation module, a pulse skip determination module, and a duty cycle adjustment module. The pulse-width modulation module generates three duty cycle values based on three voltage requests, respectively. A plurality of solid-state switches control three phases of the motor in response to the three duty cycle values, respectively. The pulse skip determination module generates a pulse skip signal. The duty cycle adjustment module selectively prevents the plurality of solid-state switches from switching during intervals specified by the pulse skip signal.

21 Claims, 13 Drawing Sheets

(51) Int. Cl.
*H02P 3/00* (2006.01)
*H02P 7/06* (2006.01)
*H02P 27/04* (2006.01)
*H02P 27/08* (2006.01)
*H02P 21/14* (2006.01)

(56) References Cited

U.S. PATENT DOCUMENTS

| | | | |
|---|---|---|---|
| 4,428,016 A | 1/1984 | Brasfield |
| 4,524,316 A | 6/1985 | Brown et al. |
| 4,662,185 A | 5/1987 | Kobayashi et al. |
| 4,672,298 A | 6/1987 | Rohatyn |
| 4,769,587 A | 9/1988 | Pettigrew |
| 4,866,588 A | 9/1989 | Rene |
| 4,940,929 A | 7/1990 | Williams |
| 5,064,356 A | 11/1991 | Horn |
| 5,187,417 A | 2/1993 | Minnich et al. |
| 5,224,025 A | 6/1993 | Divan et al. |
| 5,320,506 A | 6/1994 | Fogt |
| 5,359,281 A | 10/1994 | Barrow et al. |
| 5,371,666 A | 12/1994 | Miller |
| 5,383,109 A | 1/1995 | Maksimovic et al. |
| 5,451,832 A | 9/1995 | Cameron et al. |
| 5,457,375 A | 10/1995 | Marcinkiewicz et al. |
| 5,461,263 A | 10/1995 | Helfrich |
| 5,471,117 A | 11/1995 | Ranganath et al. |
| 5,483,136 A | 1/1996 | Marcinkiewicz |
| 5,502,370 A | 3/1996 | Hall et al. |
| 5,502,630 A | 3/1996 | Rokhvarg |
| 5,511,202 A | 4/1996 | Combs et al. |
| 5,541,484 A | 7/1996 | DiTucci |
| 5,563,781 A | 10/1996 | Clauter et al. |
| 5,565,752 A | 10/1996 | Jansen et al. |
| 5,576,941 A | 11/1996 | Nguyen et al. |
| 5,602,465 A | 2/1997 | Clemente |
| 5,604,385 A | 2/1997 | David |
| 5,605,053 A | 2/1997 | Otori |
| 5,606,950 A | 3/1997 | Fujiwara et al. |
| 5,615,097 A | 3/1997 | Cross |
| 5,617,013 A | 4/1997 | Cozzi |
| 5,631,550 A | 5/1997 | Castro et al. |
| 5,637,974 A | 6/1997 | McCann |
| 5,656,915 A | 8/1997 | Eaves |
| 5,682,306 A | 10/1997 | Jansen |
| 5,742,151 A | 4/1998 | Hwang |
| 5,742,493 A | 4/1998 | Ito et al. |
| 5,786,992 A | 7/1998 | Vinciarelli et al. |
| 5,793,168 A | 8/1998 | Vitunic |
| 5,801,935 A | 9/1998 | Sugden et al. |
| 5,838,124 A | 11/1998 | Hill |
| 5,867,379 A | 2/1999 | Maksimovic et al. |
| 5,877,660 A | 3/1999 | Ebine et al. |
| 5,917,864 A | 6/1999 | Asahara |
| 5,949,204 A | 9/1999 | Huggett et al. |
| 5,955,847 A | 9/1999 | Rothenbuhler |
| 5,960,207 A | 9/1999 | Brown |
| 5,970,727 A | 10/1999 | Hiraoka et al. |
| 5,977,660 A | 11/1999 | Mandalakas et al. |
| 6,018,203 A | 1/2000 | David et al. |
| 6,026,006 A | 2/2000 | Jiang et al. |
| 6,031,751 A | 2/2000 | Janko |
| 6,041,609 A | 3/2000 | Hornsleth et al. |
| 6,065,298 A | 5/2000 | Fujimoto |
| 6,091,215 A | 7/2000 | Lovett et al. |
| 6,091,233 A | 7/2000 | Hwang et al. |
| 6,109,048 A | 8/2000 | Kim |
| 6,116,040 A | 9/2000 | Stark |
| 6,181,120 B1 | 1/2001 | Hawkes et al. |
| 6,184,630 B1 | 2/2001 | Qian et al. |
| 6,198,240 B1 | 3/2001 | Notohara et al. |
| 6,225,767 B1 | 5/2001 | Lovett et al. |
| 6,232,734 B1 | 5/2001 | Anzai |
| 6,256,213 B1 | 7/2001 | Illingworth |
| 6,326,750 B1 | 12/2001 | Marcinkiewicz |
| 6,366,070 B1 | 4/2002 | Cooke et al. |
| 6,373,734 B1 | 4/2002 | Martinelli |
| 6,388,905 B2 | 5/2002 | Nakagawa |
| 6,392,418 B1 | 5/2002 | Mir et al. |
| 6,396,229 B1 | 5/2002 | Sakamoto et al. |
| 6,404,154 B2 | 6/2002 | Marcinkiewicz et al. |
| 6,411,065 B1 | 6/2002 | Underwood et al. |
| 6,424,107 B1 | 7/2002 | Lu |
| 6,429,673 B1 | 8/2002 | Obata et al. |
| 6,441,580 B2 | 8/2002 | Marcinkiewicz |
| 6,462,491 B1 | 10/2002 | Iijima et al. |
| 6,462,974 B1 | 10/2002 | Jadric |
| 6,467,289 B2 | 10/2002 | Kuroki et al. |
| 6,483,270 B1 | 11/2002 | Miyazaki et al. |
| 6,501,240 B2 | 12/2002 | Ueda et al. |
| 6,523,361 B2 | 2/2003 | Higashiyama |
| 6,594,158 B2 | 7/2003 | Batarseh et al. |
| 6,611,117 B1 | 8/2003 | Hardt |
| 6,619,062 B1 | 9/2003 | Shibamoto et al. |
| 6,630,806 B1 | 10/2003 | Brits et al. |
| 6,639,377 B2 | 10/2003 | Iwaji et al. |
| 6,644,980 B2 * | 11/2003 | Kameda ......................... 439/65 |
| 6,657,877 B2 | 12/2003 | Kashima et al. |
| 6,690,137 B2 | 2/2004 | Iwaji et al. |
| 6,727,668 B1 | 4/2004 | Maslov et al. |
| 6,731,083 B2 | 5/2004 | Marcinkiewicz |
| 6,735,284 B2 | 5/2004 | Cheong et al. |
| 6,756,753 B1 | 6/2004 | Marcinkiewicz |
| 6,756,757 B2 | 6/2004 | Marcinkiewicz et al. |
| 6,757,185 B2 | 6/2004 | Rojas Romero |
| 6,771,522 B2 | 8/2004 | Hayashi et al. |
| 6,772,603 B2 | 8/2004 | Hsu et al. |
| 6,822,416 B1 | 11/2004 | Kunz et al. |
| 6,825,637 B2 | 11/2004 | Kinpara et al. |
| 6,828,751 B2 | 12/2004 | Sadasivam et al. |
| 6,873,504 B2 | 3/2005 | Lifson et al. |
| 6,912,142 B2 | 6/2005 | Keim et al. |
| 6,925,823 B2 | 8/2005 | Lifson et al. |
| 6,927,553 B2 | 8/2005 | Chen |
| 6,947,504 B1 | 9/2005 | Pettit |
| 6,973,794 B2 | 12/2005 | Street et al. |
| 6,984,948 B2 | 1/2006 | Nakata et al. |
| 7,000,422 B2 | 2/2006 | Street et al. |
| 7,042,180 B2 | 5/2006 | Terry et al. |
| 7,051,542 B2 | 5/2006 | Chen et al. |
| 7,061,212 B2 | 6/2006 | Phadke |
| 7,068,016 B2 | 6/2006 | Athari |
| 7,071,641 B2 | 7/2006 | Arai et al. |
| 7,088,081 B2 | 8/2006 | Takahashi et al. |
| 7,088,881 B2 | 8/2006 | Nir |
| 7,102,305 B2 | 9/2006 | Suzuki |
| 7,133,602 B2 | 11/2006 | Yamada |
| 7,148,664 B2 | 12/2006 | Takahashi et al. |
| 7,151,359 B2 | 12/2006 | Randall et al. |
| 7,164,590 B2 | 1/2007 | Li et al. |
| 7,164,591 B2 | 1/2007 | Soldano |
| 7,176,644 B2 | 2/2007 | Ueda et al. |
| 7,183,734 B2 | 2/2007 | Lassen |
| 7,193,388 B1 | 3/2007 | Skinner et al. |
| 7,208,895 B2 | 4/2007 | Marcinkiewicz et al. |
| 7,242,163 B2 | 7/2007 | Gallegos-Lopez et al. |
| 7,262,569 B2 | 8/2007 | Douglas |
| 7,266,001 B1 | 9/2007 | Notohamiprodjo et al. |
| 7,295,452 B1 | 11/2007 | Liu et al. |
| 7,320,225 B2 | 1/2008 | Street et al. |
| 7,342,379 B2 | 3/2008 | Marcinkiewicz et al. |
| 7,348,756 B2 | 3/2008 | Ma et al. |
| 7,352,151 B2 | 4/2008 | Fujitsuna et al. |
| 7,359,224 B2 | 4/2008 | Li |
| 7,375,485 B2 | 5/2008 | Shahi et al. |
| 7,388,340 B2 | 6/2008 | Nojima |
| 7,391,181 B2 | 6/2008 | Welchko et al. |
| 7,392,158 B2 | 6/2008 | Hikawa et al. |
| 7,403,404 B2 | 7/2008 | Oka et al. |
| 7,420,351 B2 | 9/2008 | Grbovic |
| 7,459,874 B2 | 12/2008 | Bae et al. |
| 7,495,410 B2 | 2/2009 | Zargari et al. |
| 7,501,776 B2 | 3/2009 | Lee et al. |
| 7,504,797 B2 | 3/2009 | Tomigashi et al. |
| 7,570,002 B2 | 8/2009 | Peng |

(56) References Cited

U.S. PATENT DOCUMENTS

| | | | |
|---|---|---|---|
| 7,583,049 B2 | 9/2009 | Marcinkiewicz et al. |
| 7,586,286 B2 | 9/2009 | Cheng et al. |
| 7,591,038 B2 | 9/2009 | Murray et al. |
| 7,595,613 B2 | 9/2009 | Thompson et al. |
| 7,615,891 B2 | 11/2009 | Wu et al. |
| 7,619,380 B2 | 11/2009 | Lo et al. |
| 7,619,385 B2 | 11/2009 | Suzuki et al. |
| 7,626,349 B2 | 12/2009 | Marcinkiewicz et al. |
| 7,638,967 B2 | 12/2009 | Aizawa et al. |
| 7,667,423 B2 | 2/2010 | Shahi et al. |
| 7,667,986 B2 | 2/2010 | Artusi et al. |
| 7,675,759 B2 | 3/2010 | Artusi et al. |
| 7,683,568 B2 | 3/2010 | Pande et al. |
| 7,688,608 B2 | 3/2010 | Oettinger et al. |
| 7,694,538 B2 | 4/2010 | Thorn et al. |
| 7,733,044 B2 | 6/2010 | Nakamura et al. |
| 7,759,886 B2 | 7/2010 | Gallegos-Lopez et al. |
| 7,770,806 B2 | 8/2010 | Herzon et al. |
| 7,796,389 B2 | 9/2010 | Edmunds et al. |
| 7,834,573 B2 | 11/2010 | Lindsey et al. |
| 7,843,155 B2 | 11/2010 | Rozman et al. |
| 7,854,137 B2 | 12/2010 | Lifson et al. |
| 7,888,881 B2 | 2/2011 | Shteynberg et al. |
| 7,898,197 B2 | 3/2011 | Tomigashi |
| 7,905,122 B2 | 3/2011 | Murray et al. |
| 7,908,893 B2 | 3/2011 | Thorn et al. |
| 7,923,953 B2 | 4/2011 | Gallegos-Lopez et al. |
| 7,940,020 B2 | 5/2011 | Brown |
| 7,969,125 B2 | 6/2011 | Melanson |
| 8,041,524 B2 | 10/2011 | Tan et al. |
| 8,044,618 B2 | 10/2011 | Nakatsugawa et al. |
| 8,058,824 B2 | 11/2011 | Williams et al. |
| 8,058,825 B2 | 11/2011 | Dornhof |
| 8,089,240 B2 | 1/2012 | Lee |
| 8,115,428 B2 | 2/2012 | Williams et al. |
| 8,120,298 B2 | 2/2012 | Lelkes |
| 8,146,377 B2 | 4/2012 | Karamanos |
| 8,148,928 B2 | 4/2012 | Laulanet et al. |
| 8,159,161 B2 | 4/2012 | Tomigashi |
| 8,169,180 B2 | 5/2012 | Hwang et al. |
| 8,188,700 B2 | 5/2012 | Tseng et al. |
| 8,242,727 B2 | 8/2012 | Sultenfuss et al. |
| 8,258,731 B2 | 9/2012 | Shimizu |
| 8,264,192 B2 | 9/2012 | Green et al. |
| 8,264,619 B2 | 9/2012 | Lowe |
| 8,264,860 B2 | 9/2012 | Green |
| 8,294,401 B2 | 10/2012 | Pollock et al. |
| 8,324,768 B2 | 12/2012 | Nakano et al. |
| 8,344,706 B2 | 1/2013 | Green |
| 8,358,098 B2 | 1/2013 | Skinner et al. |
| 8,406,021 B2 | 3/2013 | Green |
| 8,476,873 B2 | 7/2013 | Green |
| 8,493,014 B2 | 7/2013 | Henderson et al. |
| 8,508,166 B2 | 8/2013 | Marcinkiewicz et al. |
| 8,547,051 B2 | 10/2013 | Green et al. |
| 2001/0005320 A1 | 6/2001 | Ueda et al. |
| 2002/0057080 A1* | 5/2002 | Telefus et al. ............... 323/283 |
| 2002/0145837 A1 | 10/2002 | Krefta et al. |
| 2002/0149953 A1 | 10/2002 | Smedley et al. |
| 2003/0006723 A1 | 1/2003 | Sul et al. |
| 2003/0052640 A1 | 3/2003 | Iwaji et al. |
| 2003/0057912 A1 | 3/2003 | Iwaji et al. |
| 2003/0218444 A1 | 11/2003 | Marcinkiewicz et al. |
| 2004/0211009 A1 | 10/2004 | Murray et al. |
| 2004/0239296 A1 | 12/2004 | Turchi |
| 2004/0257028 A1 | 12/2004 | Schulz et al. |
| 2005/0030772 A1 | 2/2005 | Phadke |
| 2005/0046370 A1 | 3/2005 | Gallegos-Lopez et al. |
| 2005/0187752 A1 | 8/2005 | Colby et al. |
| 2005/0204482 A1 | 9/2005 | Murray et al. |
| 2005/0253546 A1 | 11/2005 | Dornhof |
| 2006/0013024 A1 | 1/2006 | Temesi et al. |
| 2006/0097688 A1 | 5/2006 | Patel et al. |
| 2006/0125427 A1 | 6/2006 | Kishibe et al. |
| 2006/0130504 A1 | 6/2006 | Agrawal et al. |
| 2006/0158065 A1 | 7/2006 | Pelrine et al. |
| 2006/0198172 A1 | 9/2006 | Wood |
| 2006/0290302 A1 | 12/2006 | Marcinkiewicz et al. |
| 2006/0290304 A1 | 12/2006 | Marcinkiewicz et al. |
| 2007/0120519 A1 | 5/2007 | Sakamoto et al. |
| 2007/0170880 A1 | 7/2007 | Shahi et al. |
| 2007/0186691 A1 | 8/2007 | Morishita |
| 2008/0002444 A1 | 1/2008 | Shekhawat et al. |
| 2008/0031021 A1 | 2/2008 | Ros et al. |
| 2008/0042613 A1 | 2/2008 | Aizawa et al. |
| 2008/0143289 A1 | 6/2008 | Marcinkiewicz et al. |
| 2008/0185986 A1 | 8/2008 | Marcinkiewicz et al. |
| 2008/0246445 A1 | 10/2008 | Wrathall |
| 2008/0272747 A1 | 11/2008 | Melanson |
| 2008/0278101 A1 | 11/2008 | Shahi et al. |
| 2008/0284401 A1 | 11/2008 | Oettinger et al. |
| 2008/0304189 A1 | 12/2008 | Tang et al. |
| 2008/0310200 A1 | 12/2008 | Maksimovic et al. |
| 2009/0021208 A1 | 1/2009 | Romenesko et al. |
| 2009/0122582 A1 | 5/2009 | Ye et al. |
| 2009/0153113 A1 | 6/2009 | Zilberberg |
| 2009/0160254 A1 | 6/2009 | Wu et al. |
| 2009/0168476 A1 | 7/2009 | Moon et al. |
| 2009/0174262 A1 | 7/2009 | Martin et al. |
| 2009/0243561 A1 | 10/2009 | Tan et al. |
| 2009/0303764 A1 | 12/2009 | Jin et al. |
| 2010/0066283 A1 | 3/2010 | Kitanaka |
| 2010/0080026 A1 | 4/2010 | Zhang |
| 2010/0246228 A1 | 9/2010 | Kazlauskas |
| 2010/0292943 A1 | 11/2010 | Minor et al. |
| 2010/0301787 A1 | 12/2010 | Gallegos-Lopez et al. |
| 2010/0301788 A1 | 12/2010 | Chen et al. |
| 2011/0012579 A1 | 1/2011 | Huang |
| 2011/0031920 A1 | 2/2011 | Henderson et al. |
| 2011/0031943 A1 | 2/2011 | Green |
| 2011/0057637 A1* | 3/2011 | Liu ............................... 323/287 |
| 2011/0075462 A1 | 3/2011 | Wildash |
| 2011/0127938 A1 | 6/2011 | Kawakami et al. |
| 2011/0156619 A1 | 6/2011 | Nomura |
| 2011/0175560 A1 | 7/2011 | Akiyama |
| 2012/0206077 A1 | 8/2012 | Yoneshima et al. |
| 2013/0063100 A1* | 3/2013 | Henzler ........................ 323/234 |
| 2014/0152212 A1 | 6/2014 | Zhang et al. |

FOREIGN PATENT DOCUMENTS

| | | |
|---|---|---|
| CN | 1748357 A | 3/2006 |
| CN | 1864319 A | 11/2006 |
| CN | 1890870 A | 1/2007 |
| CN | 1929290 A | 3/2007 |
| CN | 1976211 A | 6/2007 |
| CN | 101047342 A | 10/2007 |
| CN | 101345886 A | 1/2009 |
| CN | 101399516 A | 4/2009 |
| CN | 101408568 A | 4/2009 |
| CN | 201242570 Y | 5/2009 |
| CN | 101485073 A | 7/2009 |
| CN | 101958657 A | 1/2011 |
| EP | 645589 | 3/1995 |
| EP | 2276157 A1 | 1/2011 |
| EP | 2381568 A2 | 10/2011 |
| JP | 08249067 A | 9/1996 |
| JP | 09062363 A | 3/1997 |
| JP | 09308283 A | 11/1997 |
| JP | 2000044135 A | 2/2000 |
| JP | 2000199780 A | 7/2000 |
| JP | 2002199780 A | 7/2002 |
| JP | 2003018704 A | 1/2003 |
| JP | 2004112942 A | 4/2004 |
| JP | 2005207942 A | 8/2005 |
| JP | 2006034070 A | 2/2006 |
| JP | 2007259686 A | 10/2007 |
| JP | 2008125313 A | 5/2008 |
| KR | 19980080006 A | 6/2002 |
| KR | 20060009199 A | 1/2006 |
| KR | 20060129272 A | 12/2006 |
| KR | 20070064726 A | 6/2007 |
| KR | 20080060290 A | 7/2008 |
| KR | 20110001923 A | 1/2011 |

(56) References Cited

FOREIGN PATENT DOCUMENTS

| WO | 2009048563 A2 | 4/2009 |
|---|---|---|
| WO | 2009058024 A1 | 5/2009 |
| WO | 2013016505 A2 | 1/2013 |

OTHER PUBLICATIONS

"Advantages of Interleaved Boost Converters for PFC," Michael O'Loughlin, Texas Instruments, Mar. 30, 2006.
"Power-Factor Correction with Interieved Boost Converters in Continuous-Inductor-Current Mode," Laszlo Balogh and Richard Redl, IEEE 1993.
"Real-Time Computer Control: An Introduction," Bennett, S., Prentice Hall International (UK) Ltd., Chapter 2 (pp. 19-47) and Chapter 4 (pp. 99-128), 1988.
Baggio, J.E., et al., "Discrete control for three-level boost PFC converter," Telecommunications Energy Conference, 2002. Intelec. 24th Annual International, pp. 627-633,2002. doi: 10.1109/INTLEC. 2002.1048772; URL: http://ieeexplore.ieee.org/stamp/stamp.jsp?tp=&arnumber=1048722&isnumber=22440.
Examination Communication from the European Patent Office regarding European Patent Application No. 10808617.4, dated Nov. 4, 2013.
Extended European Search Report regarding Application No. 10808617.4-1242 / 2465187, dated Jan. 30, 2013.
First Chinese Office Action regarding Application No. 201080044562.6, dated Feb. 11, 2014. Translation provided by Unitalen Attorneys at Law.
First Chinese Office Action regarding Application No. 201080044563.0, dated Feb. 8, 2014. Translation provided by Unitalen Attorneys at Law.
First Chinese Office Action regarding Application No. 201080044591.2, dated Jan. 24, 2014. Translation provided by Unitalen Attorneys at Law.
First Office Action from the State Intellectual Property Office from People's Republic of China regarding Chinese Patent Application No. 201080045534.6, dated Feb. 8, 2014. Translation provided by Unitalen Attorneys at Law.
International Seach Report regarding Application No. PCT/US2010/044991, mailed Apr. 22, 2011.
International Search Report regarding Application No. PCT/US2010/044982, mailed Feb. 23, 2011.
International Search Report regarding Application No. PCT/US2010/044993, mailed Apr. 25, 2011.
International Search Report regarding Application No. PCT/US2010/044998, Apr. 21, 2011.
International Search Report regarding Application No. PCT/US2010/045005, mailed Apr. 25, 2011.
International Search Report regarding Application No. PCT/US2010/045025, mailed Apr. 18, 2011.
International Search Report regarding Application No. PCT/US2010/045032, mailed Apr. 25, 2011.
International Search Report regarding Application No. PCT/US2010/045041, mailed Feb. 22, 2011.
International Search Report regarding Application No. PCT/US2010/045046, mailed Apr. 6, 2011.
Interview Summary regarding U.S. Appl. No. 12/852,565, dated Jan. 16, 2013.
Interview Summary regarding U.S. Appl. No. 12/852,565, dated Jun. 18, 2013.
Interview Summary regarding U.S. Appl. No. 12/852,619, dated Apr. 17, 2013.
Korean Decision for Patent Grant regarding Application No. 10-2012-7006166, dated Jun. 26, 2013. Translation provided by Y.S. Chang & Associates.
Laszlo Huber et al. "Performance Evaluation of Bridgeless PFC Boost Rectifiers." Delta Products Corporation. Power Electronics Laboratory. Applied Power Electronics Conference. APEC 2007—Twenty Second Annual IEEE, IEEE, PI. Feb. 1, 2007, pp. 165-171.
Non-Final Office Action regarding U.S. Appl. No. 12/852,557, dated Jan. 3, 2013.
Non-Final Office Action regarding U.S. Appl. No. 12/852,619, dated Mar. 27, 2013.
Notice of Allowance and Fee(s) Due and Notice of Allowability regarding U.S. Appl. No. 12/852,549, dated Apr. 2, 2012.
Notice of Allowance and Fee(s) Due regarding U.S. Appl. No. 12/852,553, dated Sep. 21, 2012.
Notice of Allowance and Fee(s) Due regarding U.S. Appl. No. 12/852,565, dated Mar. 4, 2013.
Notice of Allowance and Fee(s) Due regarding U.S. Appl. No. 12/852,578, dated Nov. 23, 2012.
Notice of Allowance and Fee(s) Due regarding U.S. Appl. No. 12/852,961, dated Mar. 8, 2013.
Notice of Allowance and Fees Due regarding U.S. Appl. No. 12/852,625, dated Mar. 15, 2012.
Notice of Allowance regarding U.S. Appl. No. 12/852,585, dated Aug. 28, 2012.
Notice of Grounds for Rejection regarding Korean Patent Application No. 10-2012-7006210, dated Mar. 22, 2013. Translation provided by Y.S. Chang & Associates.
Notification of Grounds for Refusal regarding Korean Patent Application No. 10-2012-7006277, dated Jul. 23, 2013. Translation provided by Y.S. Chang & Associates.
Office Action regarding U.S. Appl. No. 12/852,565, dated Oct. 15, 2012.
Song Dan; Shanghia University; The air conditioning compressor drive sensorless permanent magnet synchronous motor vector control method; Mar. 2008; 26 pages.
Written Opinion of the International Searching Authority regarding Application No. PCT/US2010/044982, mailed Feb. 23, 2011.
Written Opinion of the International Searching Authority regarding Application No. PCT/US2010/044991, mailed Apr. 22, 2011.
Written Opinion of the International Searching Authority regarding Application No. PCT/US2010/044993, mailed Apr. 25, 2011.
Written Opinion of the International Searching Authority regarding Application No. PCT/US2010/044998, mailed Apr. 21, 2011.
Written Opinion of the International Searching Authority regarding Application No. PCT/US2010/045005, mailed Apr. 25, 2011.
Written Opinion of the International Searching Authority regarding Application No. PCT/US2010/045025, mailed Apr. 18, 2011.
Written Opinion of the International Searching Authority regarding Application No. PCT/US2010/045032, mailed Apr. 25, 2011.
Written Opinion of the International Searching Authority regarding Application No. PCT/US2010/045041, mailed Feb. 22, 2011.
Written Opinion of the International Searching Authority regarding Application No. PCT/US2010/045046, mailed Apr. 6, 2011.
International Search Report regarding Application No. PCT/US2013/054359, mailed Nov. 22, 2013.
Written Opinion of the International Searching Authority regarding Application No. PCT/US2013/054359, mailed Nov. 22, 2013.
Notice of Allowance and Fees Due regarding U.S. Appl. No. 13/964,595, dated May 27, 2015.
Notice of Allowance regarding U.S. Appl. No. 14/042,050, dated Jul. 6, 2015.
Examination Report No. 1 regarding Australian Application No. 2010282629 dated Jun. 3, 2013.
Notice of Acceptance regarding Australian Application No. 2010282629, dated Mar. 3, 2014.
Notification for Patent Registration Formality and Grant of Patent Right for Invention regarding Chinese Application No. 201080045539.9 dated Nov. 6, 2014; Translated by Unitalen Attorneys At Law.
Decision for Patent Grant regarding Korean Application No. 10-2012-7006277 dated Jan. 22, 2014; Translated by Y.S. Change & Associates.
Notification of Grounds for Refusal regarding Korean Application No. 10-2012-7006277 dated Sep. 23, 2013; Translated by Y.S. Change & Associates.
First Office Action from the State Intellectual Property Office of People's Republic of China regarding Chinese Patent Application No. 201080044561.1, dated Apr. 1, 2014. Translation provided by Unitalen Attorneys at Law.

(56) References Cited

OTHER PUBLICATIONS

First Office Action from State Intellectual Property Office for People's Republic of China regarding Chinese Patent Application No. 201080044559.4, dated Apr. 17, 2014. Translation provided by Unitalen Attorneys at Law.

Second Office Action from the State Intellectual Property Office of People's Republic of China regarding Chinese Patent Application No. 201080045539.9, dated Jul. 17, 2014. Translation provided by Unitalen Attorneys at Law.

First Office Action from the State Intellectual Property Office of People's Republic of China regarding Application No. 201080044566.4, dated Jun. 17, 2014. Translation provided by Unitalen Attorneys at Law.

Second Office Action from the State Intellectual Property Office from People's Republic of China regarding Chinese Application No. 201080044559.4, dated Oct. 10, 2014. Translation provided by Unitalen Attorneys at Law.

Examination Communication regarding EP10808617.4, dated Dec. 9, 2014.

\* cited by examiner

MOTOR DRIVE CONTROL USING PULSE-WIDTH MODULATION PULSE SKIPPING

CROSS-REFERENCE TO RELATED APPLICATIONS

This application claims the benefit of U.S. Provisional Application No. 61/682,149, filed on Aug. 10, 2012, U.S. Provisional Application No. 61/697,079, filed on Sep. 5, 2012, U.S. Provisional Application No. 61/729,229, filed on Nov. 21, 2012, and U.S. Provisional Application No. 61/755,230, filed on Jan. 22, 2013. The entire disclosures of these applications are incorporated herein by reference.

FIELD

The present disclosure relates to electric motor control systems and methods.

BACKGROUND

Electric motors are used in a wide variety of industrial and residential applications including, but not limited to, heating, ventilating, and air conditioning (HVAC) systems. For example only, an electric motor may drive a compressor in an HVAC system. One or more additional electric motors may also be implemented in the HVAC system. For example only, the HVAC system may include another electric motor that drives a fan associated with a condenser. Another electric motor may be included in the HVAC system to drive a fan associated with an evaporator.

SUMMARY

A control system for a motor includes a pulse-width modulation module, a mode determination module, a pulse skip determination module, a duty cycle adjustment module, a pulse module, and an inverter power module. The pulse-width modulation module generates three duty cycle values based respectively on three voltage requests and based on a bus voltage. The mode determination module selectively enables a pulse skipping mode based on a speed of the motor. The pulse skip determination module, in response to the pulse skipping mode being enabled, serially generates pulse skipping numbers. The pulse skipping numbers are selected randomly from a group consisting of zero, one, and two. The duty cycle adjustment module, for each switching period of a plurality of switching periods, selectively sets the three duty cycle values to a zero value in response to a corresponding one of the pulse skipping numbers being nonzero. The pulse module, for each of the switching periods, generates three pulse waveforms in response to the three duty cycle values as modified by the duty cycle adjustment module. The inverter power module controls three phases of the motor based on the three pulse waveforms, respectively.

A control system for a motor includes a pulse-width modulation module, a pulse skip determination module, and a duty cycle adjustment module. The pulse-width modulation module generates three duty cycle values based on three voltage requests, respectively. A plurality of solid-state switches control three phases of the motor in response to the three duty cycle values, respectively. The pulse skip determination module generates a pulse skip signal. The duty cycle adjustment module selectively prevents the plurality of solid-state switches from switching during intervals specified by the pulse skip signal.

In other features, the pulse-width modulation module generates each of the three duty cycle values based on a ratio of each of the three voltage requests, respectively, to a voltage of a bus, wherein the bus provides power to the motor via the solid-state switches. The system also includes a mode determination module that generates a mode signal in response to at least one motor operating parameter. In response to the mode signal being in a first state, the duty cycle adjustment module prevents the plurality of solid-state switches from switching during intervals specified by the pulse skip signal. The motor operating parameter is a speed of the motor. The mode determination module sets the mode signal to the first state in response to the speed of the motor being less than a predetermined threshold.

In further features, the system also includes a pulse module that generates three pulse waveforms using duty cycles set by the three duty cycle values, respectively. The plurality of solid-state switches are controlled based on the three pulse waveforms. The duty cycle adjustment module selectively prevents the plurality of solid-state switches from switching by causing the pulse module to generate the three pulse waveforms using duty cycles of zero percent.

In other features, the pulse skip determination module generates the pulse skip signal based on a series of integer values. The duty cycle adjustment module prevents the plurality of solid-state switches from switching in response to the pulse skip signal having a first state. The pulse skip determination module generates the pulse skip signal having the first state in response to a present one of the series of integer values being nonzero. The duty cycle adjustment module sets the three duty cycle values to the zero value for a number of consecutive switching periods, where the number is equal to the nonzero one of the pulse skipping numbers. The series of integer values is a predetermined sequence. The system also includes a random number generator that generates the series of integer values.

A method of controlling a motor includes generating three duty cycle values based on three voltage requests, respectively. A plurality of solid-state switches control three phases of the motor in response to the three duty cycle values, respectively. The method further includes generating a pulse skip signal, and selectively preventing the plurality of solid-state switches from switching during intervals specified by the pulse skip signal.

In other features, the method includes generating each of the three duty cycle values based on a ratio of each of the three voltage requests, respectively, to a voltage of a bus, wherein the bus provides power to the motor via the solid-state switches. The method includes generating a mode signal in response to at least one motor operating parameter, and in response to the mode signal being in a first state, preventing the plurality of solid-state switches from switching during intervals specified by the pulse skip signal.

In further features, the motor operating parameter is a speed of the motor, and the method includes setting the mode signal to the first state in response to the speed of the motor being less than a predetermined threshold. The method includes generating three pulse waveforms using duty cycles set by the three duty cycle values, respectively. The plurality of solid-state switches are controlled based on the three pulse waveforms. The selectively preventing the plurality of solid-state switches from switching is performed by causing the three pulse waveforms to be generated using duty cycles of zero percent.

In other features, the method includes generating the pulse skip signal based on a series of integer values, and preventing the plurality of solid-state switches from switching in response to the pulse skip signal having a first state. The method includes generating the pulse skip signal having the first state in response to a present one of the series of integer values being nonzero. The series of integer values is a predetermined sequence. The method includes randomly generating the series of integer values.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
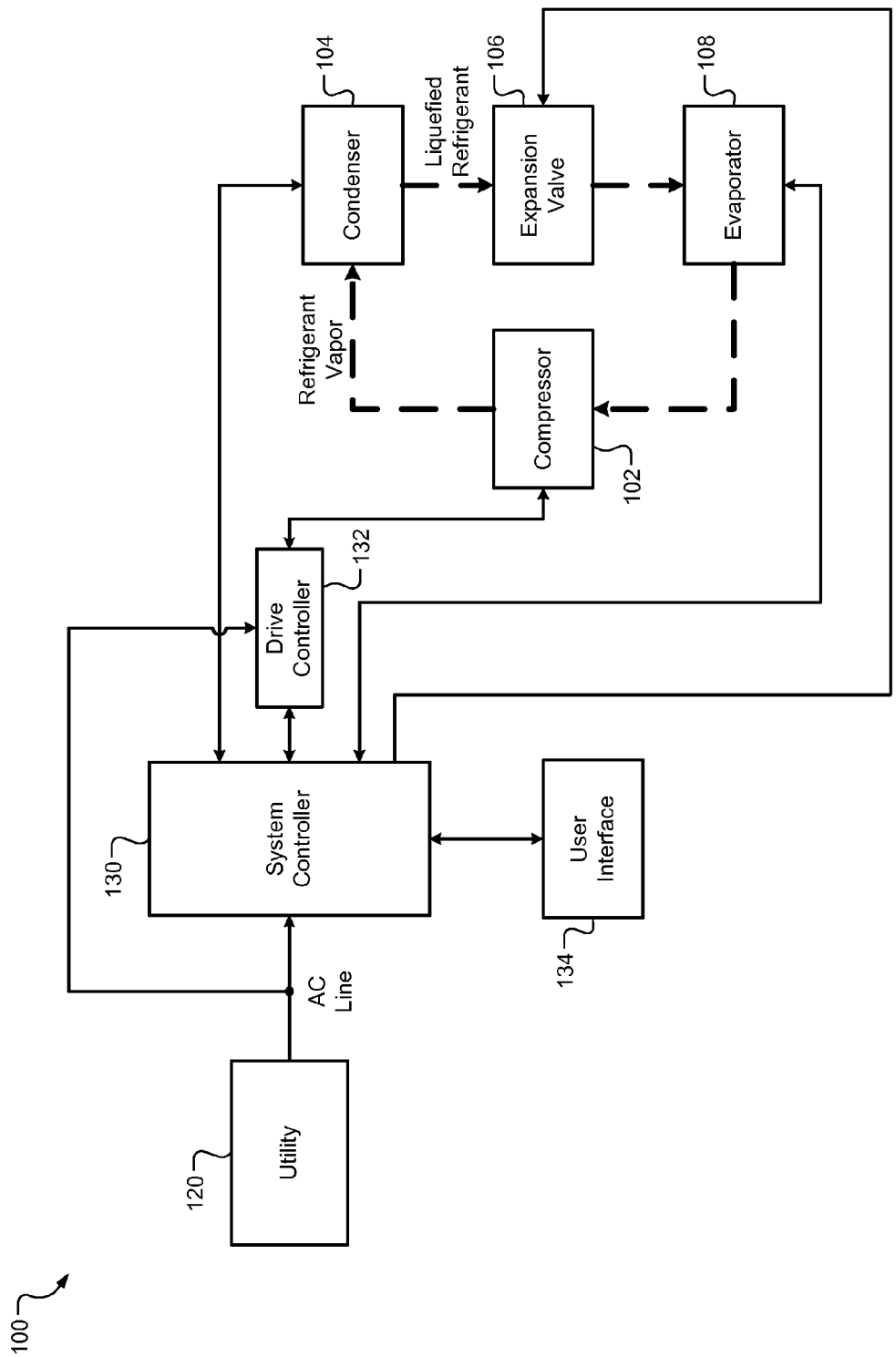
FIG. 1 is a functional block diagram of an example refrigeration system.

FIG. 1 is a functional block diagram of an example refrigeration system 100 including a compressor 102, a condenser 104, an expansion valve 106, and an evaporator 108. According to the principles of the present disclosure, the refrigeration system 100 may include additional and/or alternative components. In addition, the present disclosure is applicable to other types of refrigeration systems including, but not limited to, heating, ventilating, and air conditioning (HVAC), heat pump, refrigeration, and chiller systems.

The compressor 102 receives refrigerant in vapor form and compresses the refrigerant. The compressor 102 provides pressurized refrigerant in vapor form to the condenser 104. The compressor 102 includes an electric motor that drives a pump. For example only, the pump of the compressor 102 may include a scroll compressor and/or a reciprocating compressor.

All or a portion of the pressurized refrigerant is converted into liquid form within the condenser 104. The condenser 104 transfers heat away from the refrigerant, thereby cooling the refrigerant. When the refrigerant vapor is cooled to a temperature that is less than a saturation temperature, the refrigerant transforms into a liquid (or liquefied) refrigerant. The condenser 104 may include an electric fan that increases the rate of heat transfer away from the refrigerant.

The condenser 104 provides the refrigerant to the evaporator 108 via the expansion valve 106. The expansion valve 106 controls the flow rate at which the refrigerant is supplied to the evaporator 108. The expansion valve 106 may include a thermostatic expansion valve or may be controlled electronically by, for example, a system controller 130. A pressure drop caused by the expansion valve 106 may cause a portion of the liquefied refrigerant to transform back into the vapor form. In this manner, the evaporator 108 may receive a mixture of refrigerant vapor and liquefied refrigerant.

The refrigerant absorbs heat in the evaporator 108. Liquid refrigerant transitions into vapor form when warmed to a temperature that is greater than the saturation temperature of the refrigerant. The evaporator 108 may include an electric fan that increases the rate of heat transfer to the refrigerant.

A utility 120 provides power to the refrigeration system 100. For example only, the utility 120 may provide single-phase alternating current (AC) power at approximately 230 Volts (V) root mean squared ($V_{RMS}$) or at another suitable voltage. In various implementations, the utility 120 may provide three-phase AC power at approximately 400 $V_{RMS}$ or 480 $V_{RMS}$ at a line frequency of, for example, 50 or 60 Hz. The utility 120 may provide the AC power to the system controller 130 via an AC line. The AC power may also be provided to a drive controller 132 via the AC line.

The system controller 130 controls the refrigeration system 100. For example only, the system controller 130 may control the refrigeration system 100 based on user inputs and/or parameters measured by various sensors (not shown). The sensors may include pressure sensors, temperature sensors, current sensors, voltage sensors, etc. The sensors may also include feedback information from the drive control, such as motor currents or torque, over a serial data bus or other suitable data buses.

A user interface 134 provides user inputs to the system controller 130. The user interface 134 may additionally or alternatively provide the user inputs to the drive controller 132. The user inputs may include, for example, a desired temperature, requests regarding operation of a fan (e.g., the evaporator fan), and/or other suitable inputs. The system controller 130 may control operation of the fans of the condenser 104, the evaporator 108, and/or the expansion valve 106.

The drive controller 132 may control the compressor 102 based on commands from the system controller 130. For example only, the system controller 130 may instruct the drive controller 132 to operate the compressor motor at a certain speed. In various implementations, the drive controller 132 may also control the condenser fan.

Figure 2:
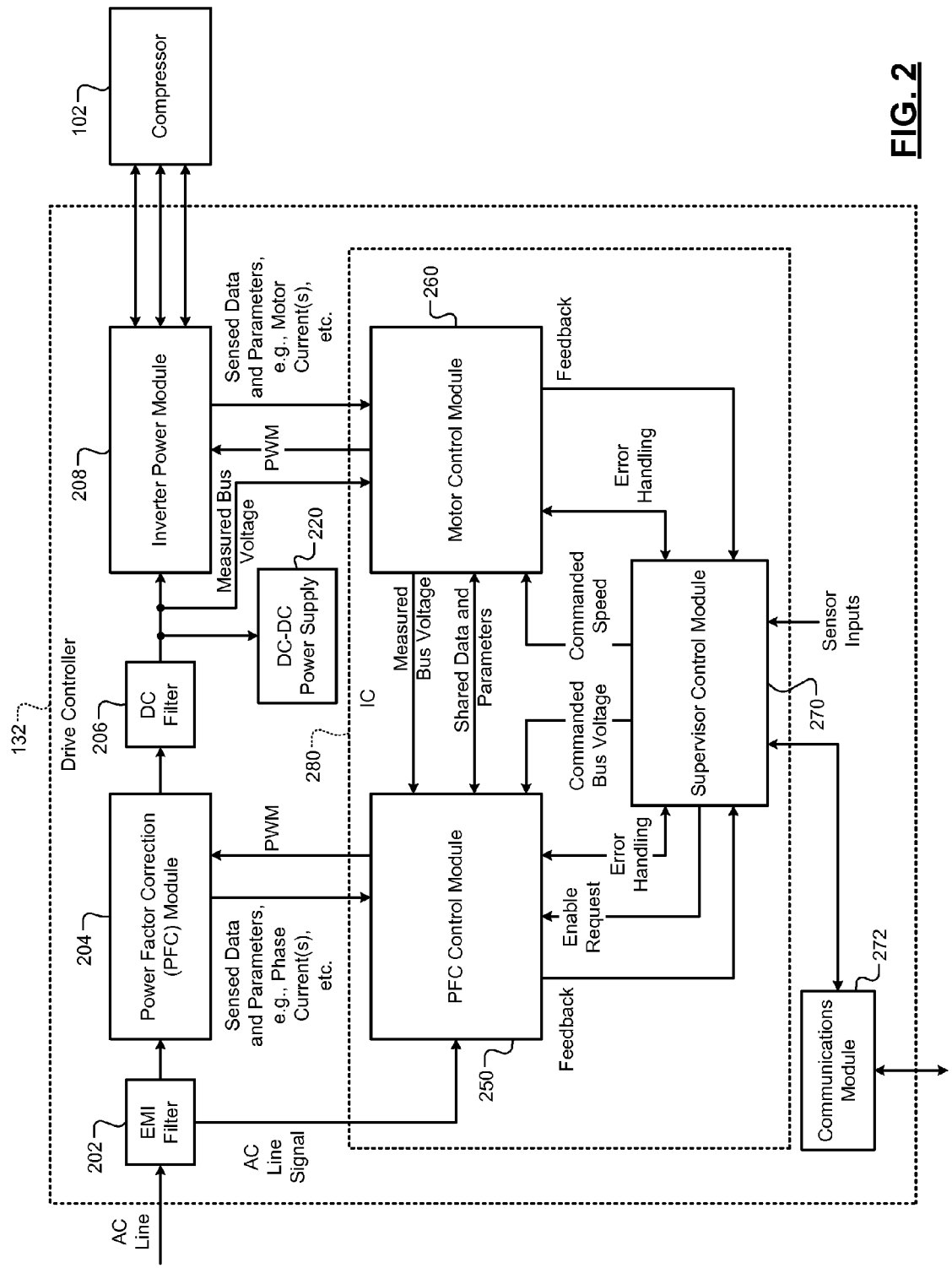
FIG. 2 is a functional block diagram of an example drive controller and an example compressor.

FIG. 2 is a functional block diagram of an example implementation of the drive controller 132. An electromagnetic interference (EMI) filter 202 reduces EMI that might otherwise be injected back onto the AC line by the drive controller 132. The EMI filter 202 may also filter EMI carried on the AC line.

A power factor correction (PFC) module 204 receives AC power from the AC line as filtered by the EMI filter 202. The PFC module 204 rectifies the AC power, thereby converting the AC input power into direct current (DC) power. The generated DC power is provided at positive and negative terminals of the PFC module 204. The PFC module 204 also selectively provides power factor correction between the input AC power and the generated DC power.

The PFC module 204 selectively boosts the AC power to a DC voltage that is greater than a peak voltage of the AC power. The term selectively means that the PFC module 204 is configured to boost the AC power under some conditions and to not boost the AC power under other conditions. For example only, the PFC module 204 may operate in a passive mode, where the DC voltage generated is less than a peak voltage of the AC power. The PFC module 204 may also operate in an active mode, where the DC voltage generated is greater than the peak voltage of the AC power. A DC voltage that is greater than the peak voltage of the AC power may be referred to as a boosted DC voltage.

AC power having an RMS voltage of 230 $V_{RMS}$ has a peak voltage of approximately 325 V (230 V multiplied by the square root of 2). For example only, when operating from AC power having an RMS voltage of 230 $V_{RMS}$, the PFC module 204 may generate boosted DC voltages between approximately 350 V (which may also be represented as 350 VDC or 350 $V_{DC}$) and approximately 410 V. For example only, the lower limit of 350 V may be imposed to avoid unstable operating regimes of the PFC module 204. The limits may vary, such as with the voltage of the AC input. In various implementations, the PFC module 204 may be capable of achieving higher boosted DC voltages than 410 V and/or lower boosted voltages than 350 V. However, an upper limit, such as 410 V, may be imposed to improve long-term reliability of components that would experience greater stress at higher voltages, such as components in a DC filter 206. In various implementations, the upper and/or lower limits may be dynamically varied.

The DC filter 206 filters the DC power generated by the PFC module 204. The DC filter 206 minimizes ripple voltage present in the DC power that results from the conversion of AC power to DC power. In various implementations, the DC filter 206 may include one or more series or parallel filter capacitors connected between the positive and negative terminals of the PFC module 204. In such implementations, the positive and negative terminals of the PFC module 204 may be connected directly to positive and negative terminals of an inverter power module 208.

The inverter power module 208 (described in more detail with reference to FIGS. 3A, 3B, and 3C) converts the DC power, as filtered by the DC filter 206, into AC power that is provided to the compressor motor. For example only, the inverter power module 208 may convert the DC power into three-phase AC power and provide the phases of the AC power to three respective windings of the motor of the compressor 102. In other implementations, the inverter power module 208 may convert the DC power into more or fewer phases of power. Further, the principles of the present disclosure apply to motors having more or fewer windings than three.

A DC-DC power supply 220 may also receive the filtered DC power. The DC-DC power supply 220 converts the DC power into one or more DC voltages that are suitable for various components and functions. For example only, the DC-DC power supply 220 may reduce the voltage of the DC power to a first DC voltage that is suitable for powering digital logic and a second DC voltage that is suitable for controlling switches within the PFC module 204. For example only, the second DC voltage may be selectively applied to gate terminals of the switches. In various implementations, DC power may be provided by another DC power source (not shown)— for example, rectifier connected via a transformer to the main AC input.

In various implementations, the first DC voltage may be approximately 3.3 V and the second DC voltage may be approximately 15 V. In various implementations, the DC-DC power supply 220 may also generate a third DC voltage. For example only, the third DC voltage may be approximately 1.2 V. The third DC voltage may be derived from the first DC voltage using a voltage regulator. For example only, the third DC voltage may be used for core digital logic and the first DC voltage may be used for input/output circuitry of a PFC control module 250 and a motor control module 260.

The PFC control module 250 controls the PFC module 204, and the motor control module 260 controls the inverter power module 208. In various implementations, the PFC control module 250 controls switching of the switches within the PFC module 204, and the motor control module 260 controls switching of switches within the inverter power module 208. The PFC module 204 may be implemented with 1, 2, 3, or more phases.

A supervisor control module 270 may communicate with the system controller 130 (not shown in FIG. 2) via a communications module 272. The communications module 272 may include an input/output port and other suitable components to serve as an interface between the system controller 130 and the supervisor control module 270. The communications module 272 may implement wired and/or wireless protocols.

The supervisor control module 270 provides various commands to the PFC control module 250 and the motor control module 260. For example, the supervisor control module 270 may provide a commanded speed to the motor control module 260. The commanded speed corresponds to a desired rotational speed of the motor of the compressor 102.

In various implementations, the commanded compressor speed may be provided to the supervisor control module 270 by the system controller 130. Additionally or alternatively, the supervisor control module 270 may determine or adjust the commanded compressor speed based on inputs provided via the communications module 272 and/or parameters measured by various sensors (i.e., sensor inputs). The supervisor control module 270 may also adjust the commanded compressor speed based on feedback from the PFC control module 250 and/or the motor control module 260.

The supervisor control module 270 may also provide other commands to the PFC control module 250 and/or the motor control module 260. For example, based on the commanded speed, the supervisor control module 270 may command the PFC control module 250 to produce a commanded bus voltage. The supervisor control module 270 may adjust the commanded bus voltage based on additional inputs, such as operating parameters of the inverter power module 208, information concerning load on the motor 400, and the measured voltage of the incoming AC line.

The supervisor control module 270 may diagnose faults in various systems of the drive controller 132. For example only, the supervisor control module 270 may receive fault information from the PFC control module 250 and/or the motor control module 260. The supervisor control module 270 may also receive fault information via the communications module 272. The supervisor control module 270 may manage reporting and clearing of faults between the drive controller 132 and the system controller 130.

Responsive to the fault information, the supervisor control module 270 may instruct the PFC control module 250 and/or the motor control module 260 to enter a fault mode. For example only, in the fault mode, the PFC control module 250 may halt operation of the switches of the PFC module 204 while, in the fault mode, the motor control module 260 may halt operation of the switches of the inverter power module 208. In addition, the motor control module 260 may directly exchange fault information with the PFC control module 250. In this way, the PFC control module 250 can respond to a fault identified by the motor control module 260 even if the supervisor control module 270 is not operating correctly, and vice versa.

The PFC control module 250 controls switches in the PFC module 204 using pulse-width modulation (PWM). More specifically, the PFC control module 250 may generate PWM signals that are applied to the switches of the PFC module 204. The duty cycle of the PWM signals is varied to produce desired currents in the switches of the PFC module 204. The desired currents are calculated based on an error between a measured DC bus voltage and a desired DC bus voltage. In other words, the desired currents are calculated in order to achieve the desired DC bus voltage. The desired currents may also be based on achieving desired power factor correction parameters, such as the shapes of current waveforms in the PFC module 204. The PWM signals generated by the PFC control module 250 may be referred to as PFC PWM signals.

The motor control module 260 controls switches in the inverter power module 208 using PWM in order to achieve the commanded compressor speed. The PWM signals generated by the motor control module 260 may be referred to as inverter PWM signals. The duty cycle of the inverter PWM signals controls the current through the windings of the motor (i.e., motor currents) of the compressor 102. The motor currents control motor torque, and the motor control module 260 may control the motor torque to achieve the commanded compressor speed.

In addition to sharing fault information, the PFC control module 250 and the motor control module 260 may also share data. For example only, the PFC control module 250 may receive data from the motor control module 260 such as load, motor currents, estimated motor torque, inverter temperature, and duty cycle of the inverter PWM signals. The PFC control module 250 may also receive data from the motor control module 260, such as the measured DC bus voltage. The motor control module 260 may receive data from the PFC control module 250 such as AC line voltage, current(s) through the PFC module 204, estimated AC power, PFC temperature, and commanded bus voltage.

In various implementations, some or all of the PFC control module 250, the motor control module 260, and the supervisor control module 270 may be implemented on an integrated circuit (IC) 280. For example only, the IC 280 may include a digital signal processor (DSP), a field programmable gate array (FPGA), a microprocessor, etc. In various implementations, additional components may be included in the IC 280. Additionally, various functions shown inside the IC 280 in FIG. 2 may be implemented external to the IC 280, such as in a second IC or in discrete circuitry. For example only, the supervisor control module 270 may be integrated with the motor control module 260.

Figure 3A:
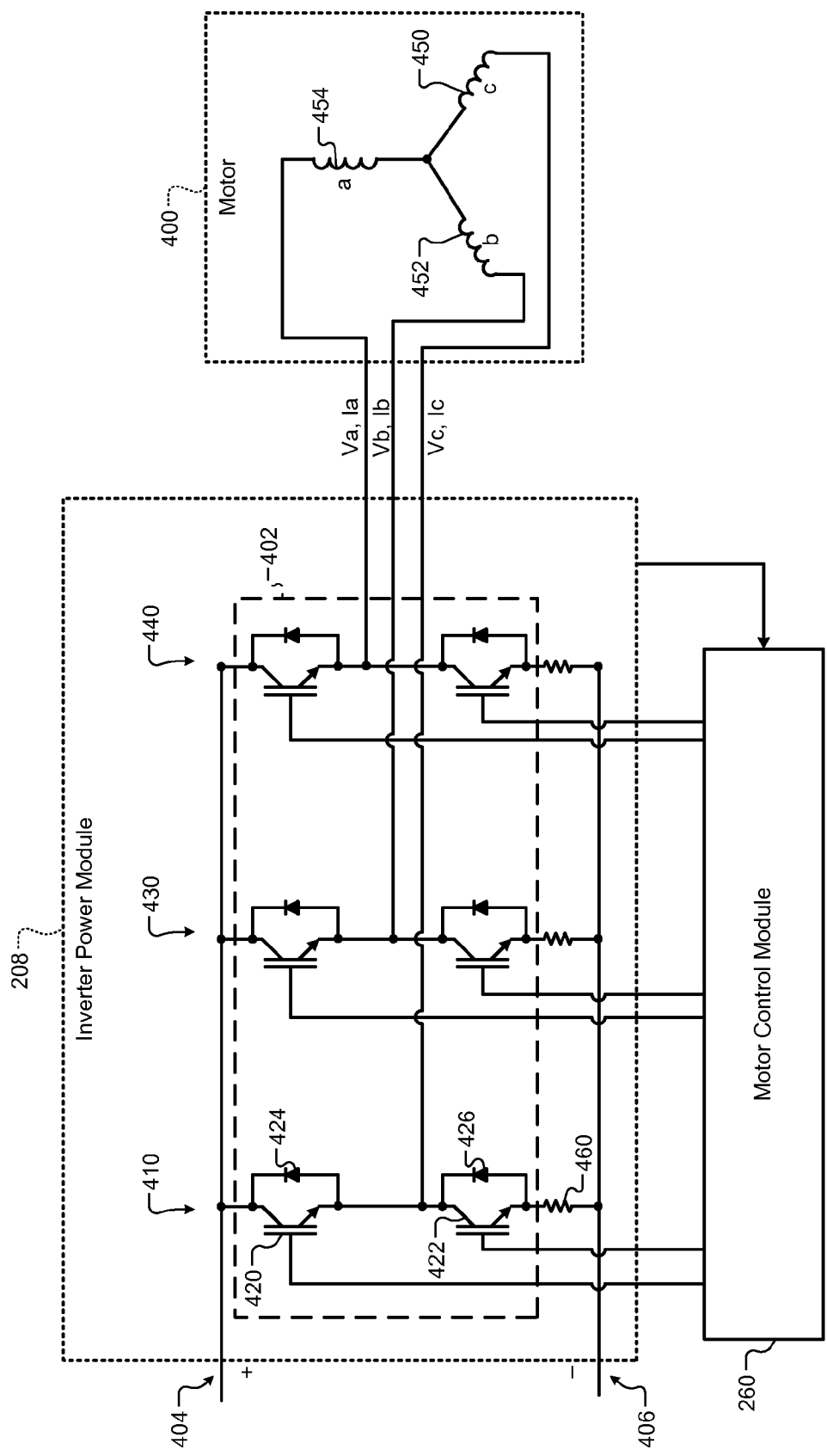
FIGS. 3A-3C are simplified schematics of example inverter power modules and example motors.

Referring now to FIG. 3A, a simplified schematic of a motor 400 and an example implementation of the inverter power module 208 are presented. The motor 400 is a component of the compressor 102 of FIG. 2. However, the principles of FIGS. 3A-3C may apply to other motors, including a motor of the condenser 104.

The inverter power module 208 includes a switch block 402. The switch block 402 receives the filtered DC voltage from the DC filter 206 via a positive DC terminal 404 and a negative DC terminal 406. The switch block 402 includes a first inverter leg 410 that includes first and second switches 420 and 422 and first and second diodes 424 and 426.

In this example, a first terminal of the first switch 420 is connected to the positive DC terminal 404, while a second terminal of the second switch 422 is connected to the negative DC terminal 406. A second terminal of the first switch 420 is connected to a first terminal of the second switch 422. An anode of the first diode 424 is connected to the second terminal of the first switch 420 and a cathode of the first diode 424 is connected to the first terminal of the first switch 420. An anode of the second diode 426 is connected to the second terminal of the second switch 422 and a cathode of the second diode 426 is connected to the first terminal of the second switch 422.

The control terminals of the switches 420 and 422 receive generally complementary signals from the motor control module 260. The motor control module 260 controls the switches 420 and 422 using PWM in order to achieve the commanded compressor speed. The duty cycle of the inverter PWM signals controls the current through the windings of the motor 400. The motor currents control motor torque, and the motor control module 260 may control the motor torque to achieve the commanded compressor speed.

In various implementations, each of the switches 420 and 422 may be implemented as an insulated gate bipolar transistor (IGBT). In such implementations, the first, second, and control terminals may correspond to collector, emitter, and gate terminals, respectively. Alternatively, the switches 420 and 422 may be implemented as other forms of solid-state switch, such as metal-oxide semiconductor field-effect transistors (MOSFETs) or power MOSFETs.

The switch block 402 may include one or more additional inverter legs. In various implementations, the switch block 402 may include one inverter leg for each phase or winding of the motor 400. For example only, the switch block 402 may include second and third inverter legs 430 and 440, as shown in FIG. 3A. The inverter legs 410, 430, and 440 may provide current to windings 450, 452, and 454 of the motor 400, respectively. The windings 454, 452, and 450 may be referred to as windings a, b, and c, respectively. Voltage applied to the windings 454, 452, and 450 may be referred to as Va, Vb, and Vc, respectively. Current through the windings 454, 452, and 450 may be referred to as Ia, Ib, and Ic, respectively.

For example only, first ends of the windings 450, 452, and 454 may be connected to a common node. Second ends of the windings 450, 452, and 454 may be connected to the second terminal of the first switch 420 of the inverter legs 410, 430, and 440, respectively.

The inverter power module 208 may also include a shunt resistor 460 that is associated with the first inverter leg 410. The shunt resistor 460 may be connected between the second terminal of the second switch 422 and the negative DC terminal 406. In various implementations, respective shunt resistors may be located between each of the inverter legs 430 and 440 and the negative DC terminal 406. For example only, current through the first winding 450 of the motor 400 may be determined based on the voltage across the shunt resistor 460 of the first inverter leg 410.

In various implementations, the shunt resistor of one of the inverter legs 410, 430, or 440 may be omitted. In such implementations, current may be inferred based on the measurements of the remaining shunt resistors. The third current may be determined based on an assumption that Ia+Ib+Ic=0.

Figure 3B:
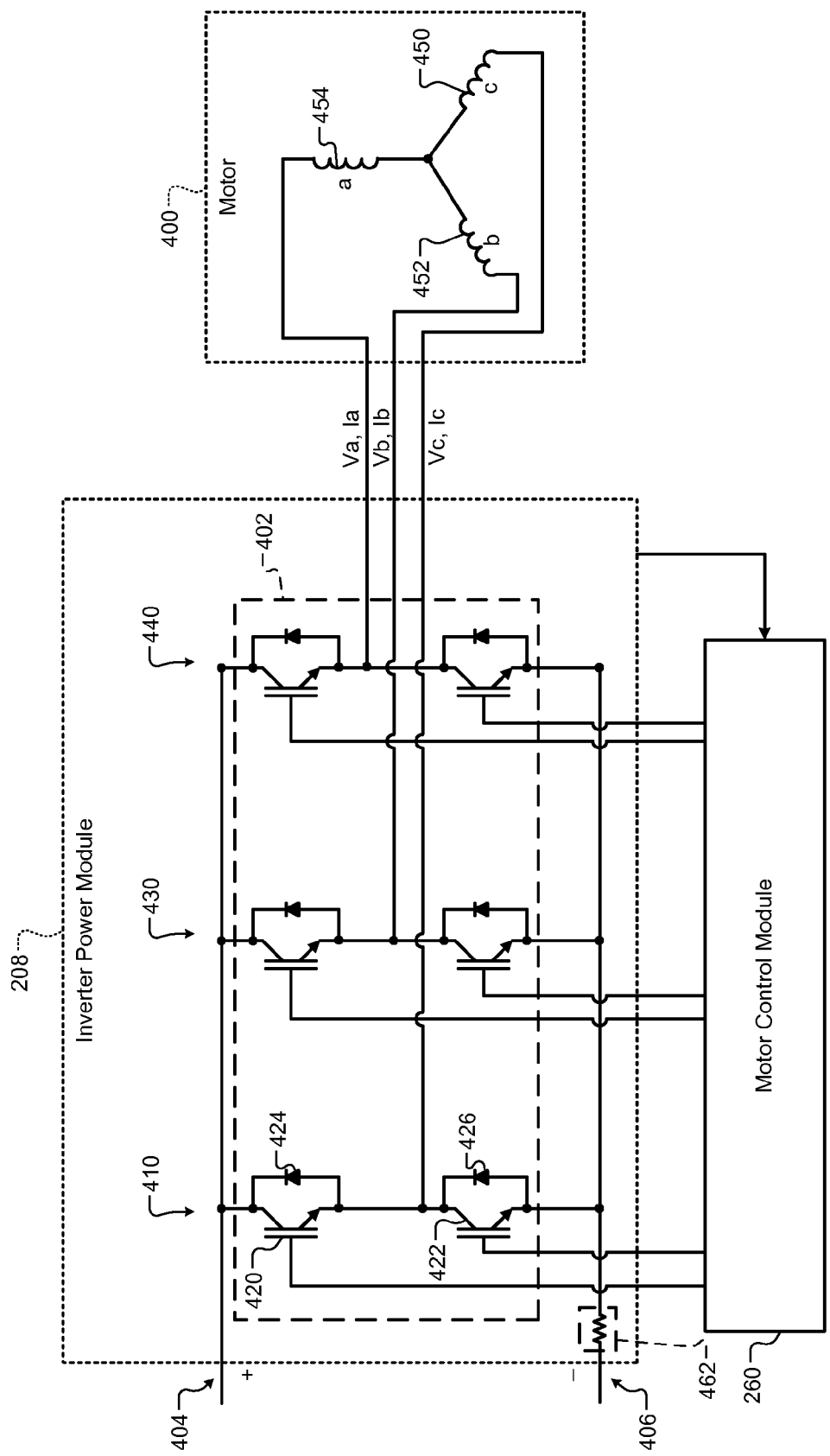

Additionally or alternatively, a resistor 462 may be connected in series with the negative DC terminal 406, as shown in FIG. 3B. Current through the resistor 462 may therefore indicate a total current consumed by the inverter power module 208. Current through each of the inverter legs 410, 430, and 440 may be inferred from the total current based on the known phase timing of the current through the inverter legs 410, 430, and 440. Further discussion of determining currents in an inverter can be found in commonly assigned U.S. Pat. No. 7,193,388, issued Mar. 20, 2007, the entire disclosure of which is hereby incorporated by reference.

Figure 3C:
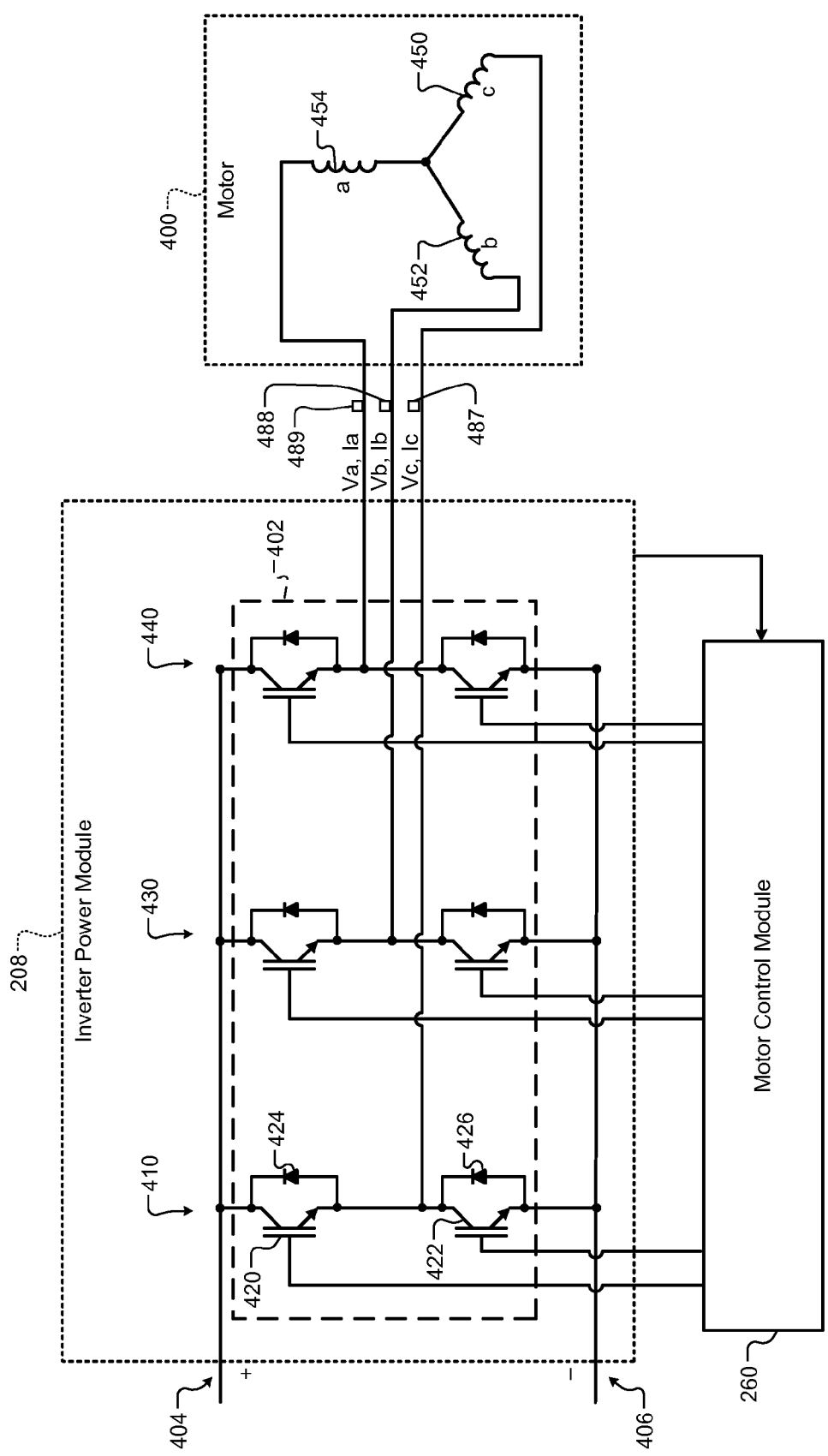

Any method of measuring or sensing current through any or all of the inverter legs 410, 430, and 440 may be used. For example, in various implementations, the current through the first inverter leg 410 may be measured using a current sensor 487, as shown in FIG. 3C. For example only, the current sensor 487 may be implemented between the first inverter leg 410 and the first winding 450. Current through the inverter legs 430 and 440 may also be measured using associated current sensors 488 and 489, respectively. In various implementations, current sensors may be associated with two of the inverter legs 410, 430, and 440. The current through the other one of the inverter legs 410, 430, and 440 may be determined based on an assumption that the current in the motor windings sums to zero.

Figure 4:
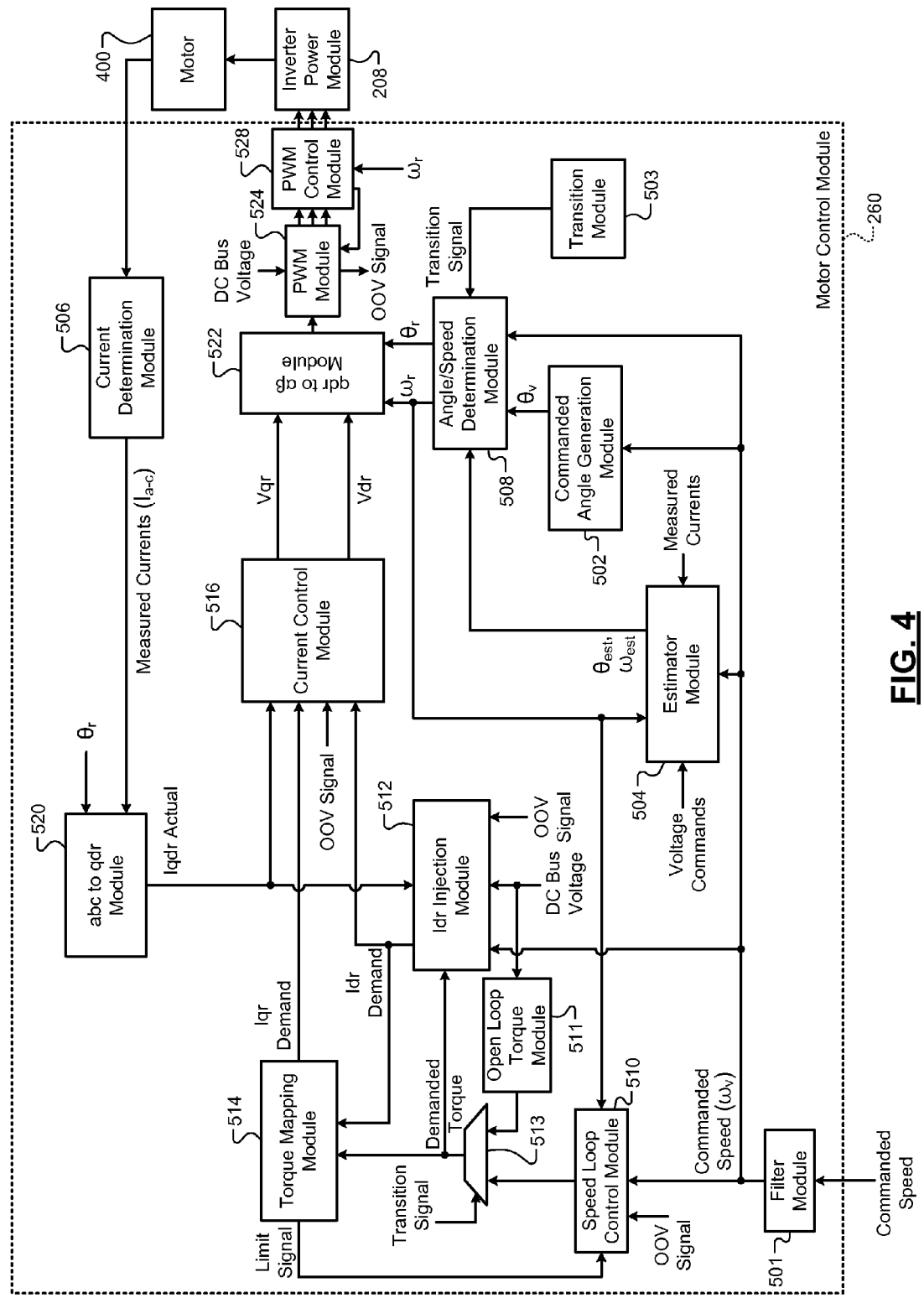
FIG. 4 is a functional block diagram of a motor control module.

Referring now to FIG. 4, an example implementation of the motor control module 260 of FIG. 2 is shown. The motor control module 260 controls switches within the inverter power module 208 to control voltages applied to the windings 454, 452, 450 (hereinafter, "windings$_{a\text{-}c}$") of the motor 400. This may also be referred to as controlling the inverter power module 208 or as controlling the motor 400.

For example, when the motor 400 includes a three-phase motor, the motor control module 260 applies voltages $V_{a\text{-}c}$ to windings$_{a\text{-}c}$, respectively. Voltages $V_{a\text{-}c}$ may collectively be referred to as output voltages. Currents $I_{a\text{-}c}$ are generated in the windings$_{a\text{-}c}$, respectively, when voltages $V_{a\text{-}c}$ are applied to the windings$_{a\text{-}c}$. Currents $I_{a\text{-}c}$ may collectively be referred to as winding currents. Currents in the windings$_{a\text{-}c}$ produce magnetic flux about the windings$_{a\text{-}c}$, and vice versa. The motor control module 260 generates the output voltages to control the winding currents and/or to control magnetic flux. The motor 400, for example, may be a three-phase internal permanent magnet ("IPM") motor or a switched reluctance ("SR") motor.

The motor 400 includes a rotor (not shown) that rotates in response to the winding currents. The motor control module 260 controls the amplitude, duty cycle, and/or frequency of the output voltages to control the torque and speed of the rotor. The motor control module 260 may control the output voltages based on a commanded motor speed, which represents a desired rotational speed of the rotor.

The motor control module 260 may implement field-oriented control of the motor 400. Accordingly, the motor control module 260 may map motor driving variables onto various frames of reference. Motor driving variables may include requested current/voltage values used to control the motor 400 as well as measured currents/voltages. For example, motor driving variables may include measured currents $I_{a\text{-}c}$ through the windings$_{a\text{-}c}$ and voltage requests used by the motor control module 260 to apply voltages $V_{a\text{-}c}$ to the windings$_{a\text{-}c}$.

The motor control module 260 may map motor driving variables in an abc frame of reference (FoR), an αβ FoR, and a qdr FoR. The abc FoR represents a three-phase stator frame based on the windings$_{a\text{-}c}$. Each of the measured currents $I_{a\text{-}c}$ may be mapped onto respective axes a, b, and c of the abc FoR. Additionally, the motor control module 260 may map requested voltages corresponding to voltages $V_{a\text{-}c}$ to the abc FoR.

The αβ FoR includes stationary, stator-based x and y coordinates onto which the motor driving variables are projected. The qdr FoR is a rotating FoR that corresponds to the rotor and rotates in sync with the rotor. Accordingly, the qdr FoR is based on an angle of the rotor.

The motor control module 260 may transform motor driving variables from one FoR to another FoR. For example, the motor control module 260 may transform currents represented in the abc FoR into currents represented in the αβ FoR, and vice versa. The motor control module 260 may transform motor driving variables from the abc FoR to the αβ FoR using a numerical transformation. The motor control module 260 may transform motor driving variables from the αβ FoR to the qdr FoR based on the angle of the rotor.

The motor control module 260 controls the inverter power module 208 based on the commanded speed from the supervisor control module 270 of FIG. 2. In various implementations, a filter module 501 may filter the commanded speed from the supervisor control module 270 of FIG. 2. In these implementations, the output of the filter module 501 is referred to below as the commanded speed $\omega_v$.

In open-loop mode, the actual speed of the rotor will generally follow the commanded speed $\omega_v$, assuming that the commanded speed $\omega_v$ does not change too quickly. As a result, the coefficients of the low-pass filter of the filter module 501 may be chosen so that the rotor acceleration can keep up with changes in the commanded speed $\omega_v$ output from the filter module 501. Otherwise, rotor synchronization may be lost. In various implementations, the filter module 501 may implement a ramp function, which updates the commanded speed $\omega_v$ by up to a maximum increment during each predetermined interval of time.

The motor control module 260 may control the motor 400 based on a commanded FoR (e.g., a qdv FoR) when operating in open-loop mode. The qdv FoR is associated with the commanded speed $\omega_v$ of the rotor and a commanded angle ($\theta_v$) of the rotor. A commanded angle generation module 502 may determine the commanded angle $\theta_v$, such as by integrating the commanded speed $W_v$.

The motor control module 260 may operate in various modes, such as an open-loop mode or a closed-loop mode. For example only, the motor control module 260 may operate in open-loop mode when starting the motor 400 and later transition to operating in closed-loop mode. When operating in open-loop mode, the rotor will tend to synchronize with the commanded speed $\omega_v$, especially when the motor control module 260 is operating the rotor at slower speeds. However, the actual rotor angle may differ from the commanded angle $\theta_v$ because of a load applied to the motor 400. For example, a change in load while operating in open-loop mode may change a phase difference between the commanded angle $\theta_v$ and the actual rotor angle.

A transition module 503 determines when to transition the motor control module 260 from open-loop mode to closed-loop mode. For example only, the transition module 503 determines when to transition based on at least one of the commanded speed $\omega_v$, an operating time of the motor 400, a load on the motor 400, at least one driving variable of the motor 400, a commanded acceleration of the rotor, and/or feedback from an estimator module 504.

For example, the transition module 503 may predict the speed of the rotor based on the commanded acceleration and/or the elapsed operating time of the motor 400. The transition module 503 may transition from open to closed-loop when the predicted speed is greater than a speed threshold. Additionally or alternatively, the transition module 503 may transition from open to closed-loop when the commanded speed $\omega_v$ is greater than the speed threshold. For example only, the speed threshold may be 1400 revolutions per minute (RPM). In various implementations, the transition module 503 may transition from open-loop mode to closed-loop mode when an elapsed time from when the motor 400 was started exceeds a predetermined period.

The estimator module 504 estimates the speed ($\omega_{est}$) and angle ($\theta_{est}$) of the rotor. The estimator module 504 may determine the estimated speed $\omega_{est}$ based on the estimated angle $\theta_{est}$. For example, the estimator module 504 may differentiate and filter the estimated angle $\theta_{est}$ over a period of time to determine the estimated speed $\omega_{est}$. The transition module 503 may transition from open to closed-loop mode when the estimator module 504 has achieved stable estimates of the estimated angle $\theta_{est}$ and the estimated speed $\omega_{est}$. In various implementations, the transition module 503 may transition from open-loop mode to closed-loop mode when convergence in the estimator module 504 has occurred, which may be indicated by, for example, flux estimates.

The estimator module 504 may determine the estimated angle $\theta_{est}$ based on various motor driving variables. For example, the motor driving variables may include voltages $V_{a-c}$ to be applied to the windings$_{a-c}$ and currents $I_{a-c}$ measured in the windings$_{a-c}$. Additionally, the estimator module 504 may determine the estimated angle $\theta_{est}$ based on the commanded speed $\omega_v$. The estimator module 504 may implement a state observer (e.g., a Luenberger observer) to determine the estimated angle $\theta_{est}$ and the estimated speed $\omega_{est}$ based on the motor driving variables. Further description of sensorless control systems and methods can be found in U.S. Pat. No. 6,756,757, issued Jun. 29, 2004, U.S. Pat. No. 7,208,895, issued Apr. 24, 2007, U.S. Pat. No. 7,342,379, issued Mar. 11, 2008, and U.S. Pat. No. 7,375,485, issued May 20, 2008, the entire disclosures of which are incorporated herein by reference.

The estimator module 504 may receive actual voltages in addition to or in place of the voltage commands. The estimator module 504 may receive a filtered and limited version of the estimated speed $\omega_{est}$. In various implementations, the filtered and limited version may be received from the angle/speed determination module 508, and may correspond to $\omega_r$. A current determination module 506 may measure the currents $I_{a-c}$ of the windings$_{a-c}$ (hereinafter "measured currents"). The estimator module 504 may use the measured currents to estimate $\theta_{est}$ and $\omega_{est}$.

An angle/speed determination module 508 generates an output angle $\theta_r$ and an output speed $\omega_r$ based on the currently enabled mode, such as open-loop mode or closed-loop mode. The angle/speed determination module 508 may set the output angle $\theta_r$ equal to the commanded angle $\theta_v$ when operating in open-loop mode and may set the output angle $\theta_r$ equal to the estimated angle $\theta_{est}$ when operating in closed-loop mode.

When the transition module 503 instructs a transition from open-loop mode to closed-loop mode, the angle/speed determination module 508 gradually adjusts the output angle $\theta_r$ from the commanded angle $\theta_v$ to the estimated angle $\theta_{est}$. This gradual adjustment may minimize transient current demands when transitioning from open-loop mode to closed-loop mode, which may prevent disruption of current control (described below) and/or estimation of the estimated angle $\theta_{est}$. The gradual adjustment may therefore improve stability during transitions and allow for starting the motor 400 more reliably, especially under higher loads.

The angle/speed determination module 508 sets the output speed $\omega_r$ equal to the commanded speed $\omega_v$ when operating in open-loop mode and sets the output speed $\omega_r$ equal to the estimated speed $\omega_{est}$ when operating in closed-loop mode. In various implementations, the angle/speed determination module 508 may immediately switch the output speed $\omega_r$ from the commanded speed $\omega_v$ to the estimated speed $\omega_{est}$ when the transition module 503 instructs a transition from open-loop mode to closed-loop mode.

The transition module 503 may also instruct a change from closed-loop mode back to open-loop mode. For example only, a transition back to open-loop mode may be performed when error conditions, such as a lost rotor, or abnormal operating conditions, are observed. The angle/speed determination module 508 may therefore also switch the output speed $\omega_r$ from the estimated speed $\omega_{est}$ back to the commanded speed $\omega_v$, and switch the output angle $\theta_r$ from the estimated angle $\theta_{est}$ back to the commanded angle $\theta_v$. In various implementations, similarly to the transition from open-loop mode to closed-loop mode, switching the output speed $\omega_r$ may be performed immediately, while switching the output angle $\theta_r$ may be performed gradually.

In various implementations, additional modes may be supported. For example only, three, four, or more modes may be supported. The transition module 503 may instruct the angle/speed determination module 508 to transition from one of the modes to another. During each transition, the angle/speed determination module 508 may switch the output speed $\omega_r$ immediately to a speed corresponding to the selected mode. Alternatively, the output speed $\omega_r$ may be ramped toward the speed of the selected mode. Further, the angle/speed determination module 508 ramps the output angle $\theta_r$ toward an angle corresponding to the selected mode. The transition module 503 may instruct the angle/speed determination module 508 to transition from one of the modes to another using a transition signal. For example, the transition signal may specify a target mode to which the angle/speed determination module 508 should transition.

A speed loop control module 510 outputs a closed-loop demanded torque signal calculated to match the output speed $\omega_r$ to the commanded speed $\omega_v$. In closed-loop mode, the output speed $\omega_r$ is equal to the estimated speed $\omega_{est}$ of the motor 400. Therefore, the speed loop control module 510 may generate the closed-loop demanded torque signal in order to keep the speed of the motor 400 approximately equal to the commanded speed $\omega_v$. For example only, when the output speed $\omega_r$ is less than the commanded speed $\omega_v$, the speed loop control module 510 may increase the closed-loop demanded torque, and vice versa.

Figure 7:
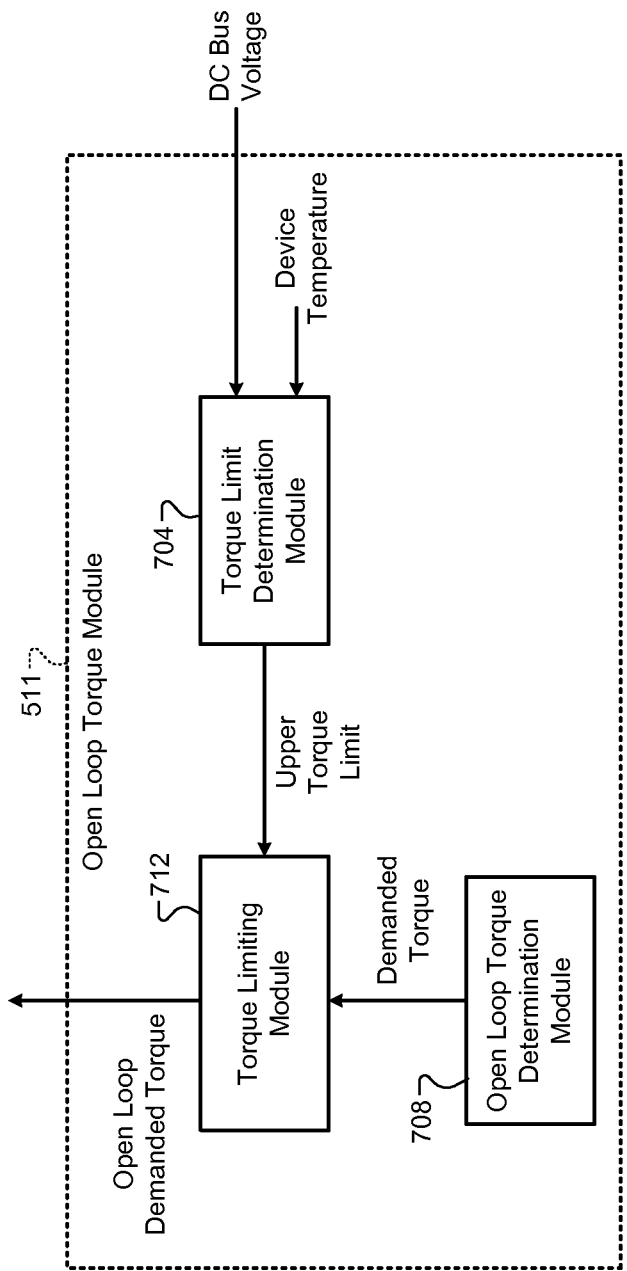
FIG. 7 is a functional block diagram of an open-loop torque module.

An open-loop torque module 511, described in more detail in FIG. 7, outputs an open-loop demanded torque signal designed to increase the speed of the motor toward a desired speed on which the commanded speed $\omega_v$ is based. In various implementations, the commanded speed $\omega_v$ is ramped toward the desired speed.

A multiplexer 513 receives the open-loop demanded torque signal from the open-loop torque module 511 and the closed-loop demanded torque signal from the speed loop control module 510. In response to the transition signal from the transition module 503, the multiplexer 513 outputs a demanded torque signal based either on the closed-loop demanded torque or the open-loop demanded torque.

In response to the transition signal indicating that the motor control module 260 is operating in closed-loop mode, the multiplexer 513 sets the demanded torque signal equal to the closed-loop demanded torque signal. In response to the transition signal indicating that the motor control module 260 is operating in open-loop mode, the multiplexer 513 sets the demanded torque signal equal to the open-loop demanded torque signal.

An Idr injection module 512 generates a d-axis current (Idr) demand based on the DC bus voltage, the demanded torque signal, and the commanded speed $\omega_v$. The Idr demand is used by current control, described below, for Idr injection, which may also be referred to as field weakening or phase advance. In various implementations, the Idr injection module 512 may adjust the Idr demand based on an out-of-volts (OOV) signal, described below, and measured current.

A torque mapping module 514 generates a q-axis current (Iqr) demand based on the demanded torque signal. Because the Idr demand may affect generated torque, the torque mapping module 514 may determine the Iqr demand based also on the Idr demand. For example only, the torque mapping module 514 may implement a maximum current limit. In various implementations, the torque mapping module 514 may compare a combination of the Idr demand and the Iqr demand to the maximum current limit, and reduce one or both of the demands when the combination exceeds the maximum current limit. In various implementations, the torque mapping module 514 may limit only the Iqr demand. For example only, the maximum current limit may be a root mean square limit, such as 25 $\text{Amps}_{RMS}$.

When the torque mapping module 514 is limiting the Iqr demand to meet the maximum current limit, the torque mapping module 514 may output a limit signal to the speed loop control module 510. When the limit signal is received, the speed loop control module 510 may temporarily suspend increasing the closed-loop demanded torque. In various implementations, the speed loop control module 510 may take similar action to temporarily suspend increasing the closed-loop demanded torque in response to the OOV signal.

For example only, the speed loop control module 510 may attempt to match the output speed $\omega_r$ to a reduced version of the commanded speed $\omega_v$. Alternatively or additionally, the speed loop control module 510 may selectively suspend error summing and/or integrating operation that would lead to increasing the closed-loop demanded torque. In other words, when the torque mapping module indicates, via the limit signal, that the maximum current limit is reached, the present demanded torque cannot be achieved within the maximum current limit. Therefore, the speed loop control module 510 may stop increasing the closed-loop demanded torque to prevent demanding even more unachievable torque.

A current control module 516 determines q-axis voltage command Vqr and d-axis voltage demand Vdr, in the qdr FoR, based on the current demands Iqr and Idr. In various implementations, the current control module 516 may determine the voltage commands Vqr and Vdr based also on the measured currents. In various implementations, the current control module 516 may attempt to match the measured currents to the Iqr and Idr demands by adjusting the voltage commands Vqr and Vdr. In various implementations, the current control module 516 may also receive the output speed $\omega_r$ (not shown in FIG. 4).

An abc to qdr module 520 maps the measured currents $I_{a-c}$ onto the qdr FoR based on the output angle $\theta_r$ from the angle/speed determination module 508. The resulting mapped current may be referred to as Iqdr, and may include Iqr and Idr components. Components of the motor control module 260, such as the current control module 516, may therefore use the Iqdr representation of the measured currents.

A qdr to αβ module 522 may transform the voltage commands Vqr and Vdr from the qdr FoR to the αβ FoR, thereby generating a voltage request in the αβ FoR (hereinafter "voltage request"). The voltage request may indicate the voltages to be applied to the windings$_{a-c}$. The qdr to αβ module 522 may perform the transformation based on the output angle $\theta_r$, and, in various implementations, may perform the transformation based on the output speed $\omega_r$.

Figure 5:
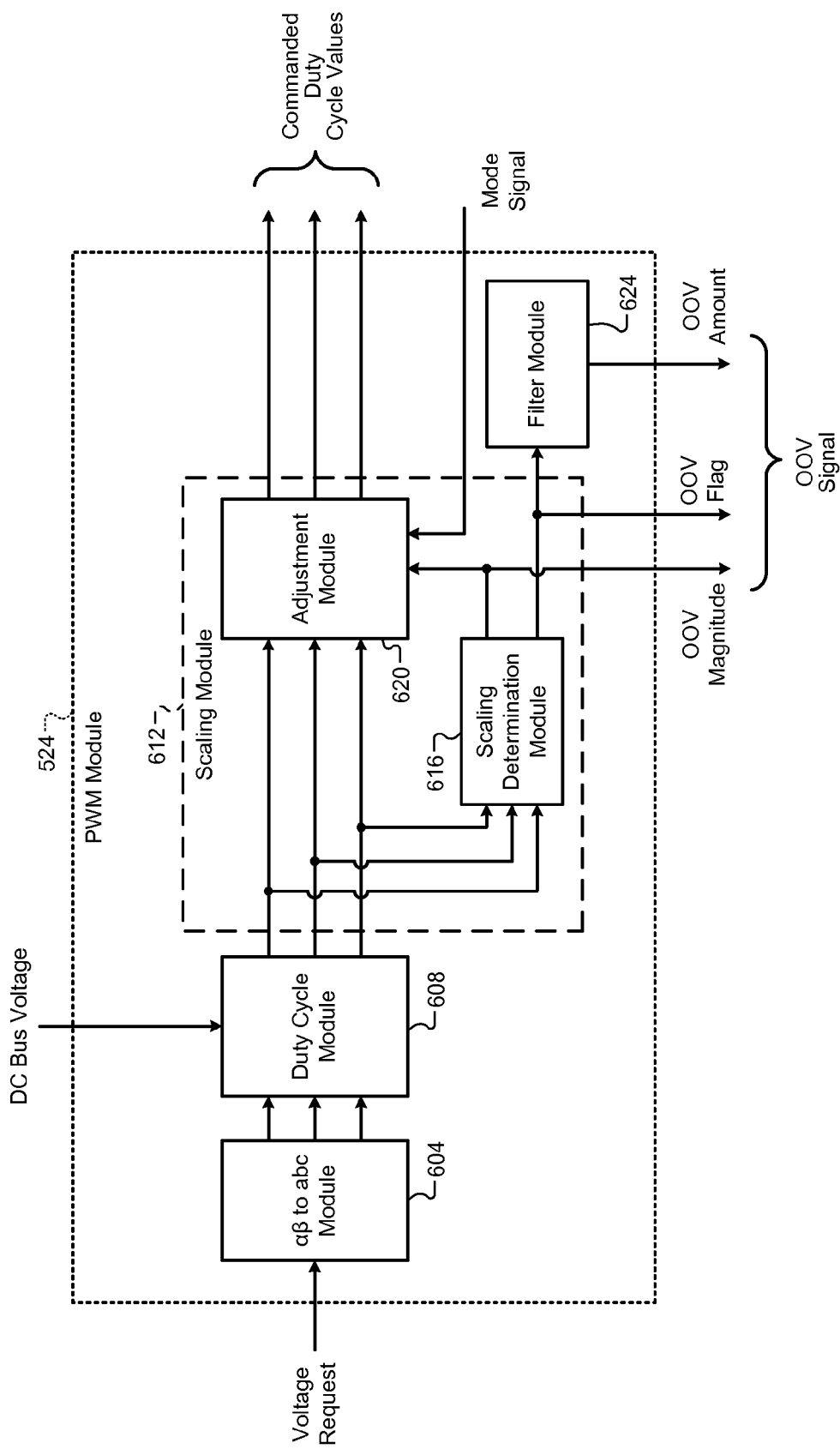
FIG. 5 is a functional block diagram of a pulse-width modulation (PWM) module.

A pulse-width modulation (PWM) module 524, described in more detail in FIG. 5, generates duty cycle values to control the inverter power module 208 using PWM. For example only, the PWM switching frequency may be approximately 5 kHz or approximately 10 kHz. In various implementations, the inverter power module 208 and the motor 400 have three phases, and the PWM module 524 therefore generates three duty cycle values, one for each inverter leg. The PWM module 524 may also receive a mode signal from a PWM control module 528.

Figure 6A:
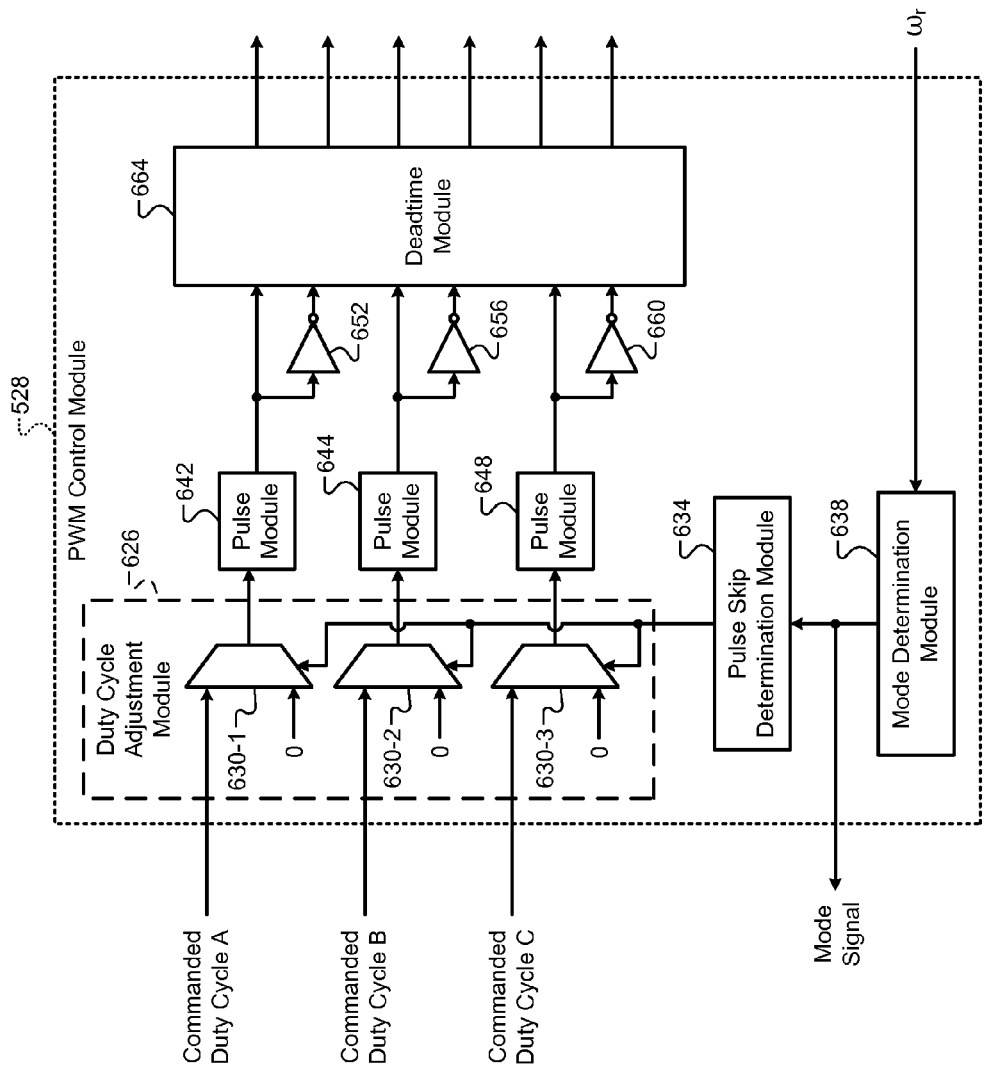
FIG. 6A is a functional block diagram of an example PWM control module.

The PWM control module 528, described in more detail in FIG. 6A, controls the inverter power module 208 by converting the duty cycle values from the PWM module 524 into driving waveforms according to the duty cycle values. The PWM control module 528 may operate in different modes in response to the output speed $\omega_r$ from the angle/speed determination module 508 and/or based on other inverter/compressor parameters (such as compressor torque/current or load). The PWM control module 528 may provide corresponding mode information to the PWM module 524, and the PWM module 524 may alter operation in response to the mode information, as described below.

In various implementations, each leg of the inverter power module 208 includes a pair of complementary switches, and each of the duty cycle values is therefore converted into a pair of complementary duty cycle values for the respective complementary switches. For example only, the switch 420 and the switch 422 of the first inverter leg 410 in FIG. 3A may be controlled with complementary duty cycle values.

In various implementations, deadtime is introduced to prevent a temporary short circuit condition, in which both complementary switches (such as switches 420 and 422) are at least partially conducting. Introducing deadtime involves adjusting when signals based on the complementary duty cycle values are applied to a switch so that the switch is not turned on when the complementary switch has not yet finished turning off. In other words, the off-times of the two switches are partially overlapped. Deadtime may be introduced by the PWM control module 528. Introduction of deadtime is also applicable to other PWM control, and so may be used for PFC control by the PFC control module 250 of FIG. 2.

Introducing deadtime may affect the time during which current is flowing and may therefore cause the actual PWM waveform produced to not match the instructed duty cycle value. Therefore, deadtime may be introduced with knowledge of in which direction current is flowing and whether the off-going transistor (the transistor turning off) will control the flow of current or whether the on-coming transistor (the complementary transistor turning on) will control the flow of current. The deadtime can be introduced in each instance so that the controlling transistor transitions at the time that will result in the instructed duty cycle value. The transition time of the other transistor is adjusted accordingly to produce the desired deadtime.

Instead of using adaptive deadtime introduction, the duty cycle values could be pre-compensated based on an understanding of how the deadtime will be introduced. In other words, the duty cycle value provided for deadtime introduction can be increased or decreased so that, once deadtime is introduced, the actual current generated in the inverter power module 208 matches the instructed duty cycle value. In the context of FIG. 5, this could mean that the PWM module 524 pre-compensates the duty cycle values provided to the PWM control module 528 based on how the PWM control module 528 is expected to introduce deadtime.

Referring now to FIG. 5, an example implementation of the PWM module 524 includes an αβ to abc module 604, which transforms the voltage requests from the qdr to αβ module 522 of FIG. 4 into the abc FoR, resulting in three voltage demands (i.e., $Vr_a$, $Vr_b$, and $Vr_c$, collectively $Vr_{a-c}$), one corresponding to each of the three windings of the motor 400. The three voltage demands represent the instantaneous voltages to be applied to the respective windings to generate desired currents.

In order to effectuate the voltage demands, a duty cycle module 608 converts the three voltage demands into three duty cycle values. Because the inverter power module 208 is powered by the DC bus, in various implementations, the duty cycle values are calculated by dividing the voltage demands by the DC bus voltage. For purposes of illustration only, when the DC bus voltage is 400 V, and a voltage demand is 320 V, the calculated duty cycle value is 80% (320 V/400 V).

In various implementations and in various operating regimes, the calculated duty cycle values may violate one or more constraints imposed on duty cycle values. For example, a maximum duty cycle limit cannot be greater than 100% by definition, and a minimum duty cycle limit cannot be less than 0% by definition. In some specific PWM implementations, a duty cycle value of 50% may be represented with the number 0, while duty cycle values of 0% and 100% are represented by −0.5 and 0.5, respectively. In other specific PWM implementations, a duty cycle value of 50% may be represented by the number 0, while duty cycle values of 0% and 100% are represented by −1 and 1, respectively. Translating between these representations is trivial mathematics and duty cycle values will be represented as percentages in the following description.

In some implementations, the maximum duty cycle limit is set to less than 100%, such as to 96%, 95%, or 92%. The maximum duty cycle limit may be set based on requirements for measurement of the winding currents $I_{a-c}$. For example, if a duty cycle of 100% were applied to one of the switches, the complementary switch would never turn on and current would not pass through a current-measuring resistor corresponding to the complementary switch. If the position of the current-measuring resistor were changed, a maximum duty cycle limit of 100% might be allowed, but the minimum duty cycle limit would be set greater than 0% to allow for current measurement. For example only, the minimum duty cycle limit could be set to 4%, 5%, or 8%. In various other implementations, the minimum duty cycle limit may be set equal to one minus the maximum duty cycle limit.

In various implementations, the motor 400 may respond not to the winding voltages themselves, but instead to differences between the winding voltages. As a simplistic example, applying 50 V to a first winding and 150 V to a second winding is generally equivalent to applying 0 V to the first winding and 100 V to the second winding. Therefore, even if one of the voltage demands may exceed an available voltage, the PWM module 524 may shift the voltage demands when generating the duty cycles. In other words, a duty cycle that exceeds the maximum duty cycle limit may be corrected by shifting all of the duty cycles down until the highest duty cycle no longer exceeds the maximum duty cycle limit.

A scaling module 612 determines whether shifting is necessary and shifts the duty cycles accordingly. In various operating regimes, the scaling module 612 may perform shifting even if no duty cycle falls outside of the duty cycle limits, as described in more detail below. Because the calculated duty cycles may be modified by the scaling module 612, they can be referred to as preliminary duty cycle values. Note that in various implementations the scaling module 612 shifts the preliminary duty cycle values even if all of the preliminary duty cycle values are between the minimum duty cycle limit and the maximum duty cycle limit.

For example only, the scaling module 612 may shift the preliminary duty cycle values so that the highest and lowest preliminary duty cycle values are, once shifted, centered about a predetermined value, such as 50%. This shifting technique is referred to as center-based control. In an alternative implementation of center-based control, the scaling module 612 may shift the preliminary duty cycle values so that an average of all the shifted duty cycle values is equal to a predetermined value, such as 50%. In various implementations, the scaling module 612 may implement both types of center-based control, and dynamically choose which to use, or may be pre-configured to use one of the types of center-based control.

When the maximum and minimum duty cycle limits are asymmetrical (such as 95% and 0%, respectively), center-based control may prevent the entire range of possible duty cycle values from being used. In other words, center-based control about 50% may effectively limit the possible duty cycle values to 5%-95% as a result of combining the center constraint with the maximum duty cycle limit. This limitation may be mitigated in implementations where center-based control is used with low voltage demands, because the duty cycle values will remain closer to 50% and not run into the 5% limit.

According to another technique called bus clamping, the scaling module 612 shifts the preliminary duty cycle values so that the lowest of the preliminary duty cycle values is shifted to a minimum allowed duty cycle, such as 0%. This is referred to as lower bus clamping. The scaling module 612 may alternatively shift the preliminary duty cycle values so that the highest of the preliminary duty cycle values is shifted to the maximum duty cycle limit, such as 95%. This is referred to as upper bus clamping.

As a numerical example, consider preliminary duty cycle values of −30%, −10%, and 40%. The first implementation of center-based control would shift the preliminary duty cycle values by 45% and result in shifted duty cycle values of 15%, 35%, and 85%. The highest and lowest shifted duty cycle values, 15% and 85%, are then equally spaced about 50%. The second implementation of center-based control would shift the preliminary duty cycle values by 50% and result in shifted duty cycle values of 20%, 40%, and 90%. The average of these three shifted duty cycle values is 50%.

Meanwhile, lower bus clamping (with a minimum allowed duty cycle of 0%) would shift the preliminary duty cycle values by 30% and result in shifted duty cycle values of 0%, 20%, and 70%. Alternatively, upper bus clamping (with a maximum allowed duty cycle of 100%) would shift the preliminary duty cycle values by 60%, resulting in shifted duty cycle values of 30%, 50%, and 100%. In various implementations, a hybrid clamping approach may be used, where control alternates between lower bus clamping and upper bus clamping depending on which approach is preferable at any moment.

The scaling module 612 may implement one or more approaches to scaling and shifting, including but not limited to those described above. The scaling/shifting approach used may be preconfigured at manufacturing time or may be selected later, such as during a first run of the motor or during each run of the motor. In various other implementations, two or more of these approaches may be used at various times by the scaling module 612. For example only, the scaling module 612 may use center-based control when the motor 400 is operating below a predetermined speed and may use a form of bus clamping, such as lower bus clamping, when the motor 400 is operating above the predetermined speed. Bus clamping may reduce switching losses because one of the inverter legs remains off for that each PWM cycle and therefore only the switches of the other inverter legs need to change state during that PWM cycle.

It is possible that the maximum and minimum duty cycle limits cannot both be met through shifting the preliminary duty cycle values. In other words, the difference between the largest of the preliminary duty cycle values and the smallest of the preliminary duty cycle values is greater than the difference between the maximum and minimum duty cycle limits. This condition is referred to as operating in an out-of-volts (OOV) state. The OOV state may be determined by a scaling determination module 616 of the scaling module 612.

For an implementation where the minimum duty cycle limit is zero, a test for OOV state can alternately be formulated as follows: operation in the OOV occurs when a difference between any two of the three voltage demands is greater than an available voltage—where the available voltage is equal to the DC bus voltage multiplied by the maximum duty cycle limit.

To respond to the OOV state, the scaling module 612 may scale the preliminary duty cycles so that they fit within the confines of the maximum and minimum duty cycle limits. In various implementations, the scaling module 612 may scale the duty cycle values or voltage demands as little as possible, such that the lowest one of the duty cycle values is set to the minimum duty cycle limit, and the highest one of the duty cycle values is set to the maximum duty cycle limit.

Scaling may be performed consistently across the three voltage demands or duty cycle values with the intent of keeping the applied voltage vector (such as the voltage vector in the αβ FoR) pointed in the same direction. In other words, the ratios of each voltage difference ($Vr_a-Vr_b$, $Vr_b-Vr_c$, and $Vr_c-Vr_a$) to each of the other voltage differences remain the same.

When the OOV state is present, scaling and shifting may both be necessary to meet the maximum/minimum duty cycle limits, and the order of scaling and shifting can be interchanged through simple mathematical transformation. For computational simplicity, when using lower bus clamping (with a minimum allowed duty cycle of 0%), shifting may be performed before scaling, as the lowest duty cycle value would remain fixed at 0% after the shifting. When using center-based control, scaling may be performed before shifting. Otherwise, scaling may change the center point of the shifted duty cycle values, requiring additional shifting.

The amount by which the duty cycle values need to be scaled can be referred to as a scaling factor. The scaling module 612 may multiply each of the duty cycle values by (1−scaling factor). For example, if the duty cycle values need to be scaled by 10% to fit within the constraints of the maximum/minimum duty cycle limits, each of the preliminary duty cycle values may be multiplied by 90% (i.e., 1−10%).

An adjustment module 620 performs any necessary scaling and shifting and outputs commanded duty cycle values to the inverter power module 208.

The scaling factor may be used as an indication of how far OOV the drive controller 132 currently is. The scaling factor may be referred to as OOV magnitude, and may be included in an OOV signal used by other components of the drive controller 132. Meanwhile, an OOV flag can be implemented to indicate whether scaling is presently being performed (in other words, that the OOV condition is present). In various implementations, the OOV flag may be set to an active value (such as 1 in an active-high environment) when scaling is being performed and set to an inactive value (such as 0 in an active-high environment) otherwise. The OOV flag may also be included in the OOV signal used by other components of the drive controller 132, including other components of the motor control module 260 of FIG. 4.

For purposes of illustration only, OOV operation may be thought in terms of a 2-dimensional circular balloon placed within a 2-dimensional rigid hexagon, where the hexagon represents the operating limits of the drive controller 132 (for the currently available DC bus voltage) and the balloon represents voltage demands. As the balloon expands, the balloon will eventually contact the hexagon at a single point on each side of the hexagon. As the balloon expands further, more and more of the balloon flattens out against the sides of the hexagon. The flattening of the balloon against the inside of the hexagon represents clipping (also referred to as OOV, and indicated by the OOV flag). In other words, the voltage demand cannot be satisfied by the drive controller 132.

An OOV amount, distinct from the OOV magnitude, may be determined based on the OOV flag. The OOV amount may represent the proportion of the time that the drive controller 132 is spending in the OOV state. The OOV amount may be determined by a filter module 624, which may determine the OOV amount by applying a digital low-pass filter to the OOV flag. For example only, the OOV amount may be determined by applying a moving average to the OOV flag, such as the following weighted moving average:

$$y(k)=\alpha \cdot y(k-1)+(1-\alpha) \cdot x(k)$$

where x(k) is the input at sample interval k and the value of α sets the rate at which the contribution of older samples decreases.

If the OOV flag assumes values of either 0 or 1, the OOV amount will range between 0 and 1, inclusive. When multiplied by 100, the OOV amount represents the percentage of time the drive controller 132 is spending in the OOV state. A value closer to 1 will indicate that the OOV state is occurring frequently, and when the OOV amount reaches 1, the OOV state will have been present continuously for as long as a filter window of the filter module 624 extends back. Similarly, when the OOV amount reaches 0, the OOV condition will have been absent for the length of the filter window.

The motor control module 260 may use multiple approaches to minimize OOV operation, or to maintain OOV operation below a predetermined threshold. In various implementations, the Idr injection module 512 of FIG. 4 may use the OOV amount in determining how to adjust the Idr demand. In addition, the speed loop control module 510 of FIG. 4 may use the OOV amount to determine when to suspend increases in the demanded torque. Further, the current control module 516 of FIG. 4 may suspend increases to one or both of the Vqr and Vdr commands based on the OOV flag.

Referring now to FIG. 6A, a functional block diagram of an example implementation of the PWM control module 528 is shown. The PWM control module 528 selectively adjusts a plurality of duty cycles based on an operating mode of the motor control module 260. The PWM control module 528 includes a duty cycle adjustment module 626, which includes first, second, and third multiplexers 630-1, 630-2, and 630-3 (collectively, multiplexers 630).

The PWM control module 528 also includes a pulse skip determination module 634 and a mode determination module 638. The mode determination module 638 generates a mode signal to determine whether the duty cycle adjustment module 626 will perform pulse skipping, which is described below. Pulse skipping may also be referred to as zero vector injection and, in short, creates a difference between each of the phases of the motor of approximately zero. Zero vector injection may be accomplished in some implementations by controlling each leg of the inverter using the same pulse width. The mode signal may also be used by the adjustment module 620 of FIG. 5 to determine when to switch from center-based control to bus clamping.

For example only, in response to the mode signal being in a first state (referred to as an active state), the duty cycle adjustment module 626 performs pulse skipping and the adjustment module 620 uses center-based control. Continuing the example, in response to the mode signal being in a second state (referred to as an inactive state), the duty cycle adjustment module 626 ceases pulse skipping and the adjustment module 620 uses bus clamping.

The mode determination module 638 receives the output speed $\omega_r$, indicating the speed of the motor 400. The mode determination module 638 then selects a pulse skipping mode in response to the output speed $\omega_r$. For example only, the mode determination module 638 sets the mode signal to the active state (enabling pulse skipping) in response to the output speed $\omega_r$ being below a predetermined speed and sets the mode signal to the inactive state (disabling pulse skipping) in response to the output speed $\omega_r$ being above the predetermined speed. For example only, the predetermined speed may be approximately 8 Hz.

In this example, when starting the motor 400, open-loop control of the motor 400 is used, pulse skipping is enabled in the PWM control module 528, and center-based control is used by the PWM module 524. At a predetermined speed, pulse skipping is disabled, and the PWM module 524 switches to using bus clamping. Subsequently, and in some implementations based on other criteria, control of the motor 400 is transitioned to closed-loop. However, enabling or disabling pulse skipping, and switching between center-based control and bus clamping may be performed at different times and based on different criteria. Likewise, enabling/disabling pulse skipping and/or switching clamping modes may be performed at the same time as, or subsequent to, the transition from open-loop control to closed-loop control.

In other implementations, the mode determination module 638 generates the mode signal based on whether the motor control module 260 is operating in open-loop mode or closed-loop mode, which may be indicated by the transition signal from the transition module 503. For example only, while the motor control module 260 is operating in open-loop mode, the mode determination module 638 may set the mode signal to the active state (enabling pulse skipping), and while the motor control module 260 is operating in closed-loop mode, the mode determination module 638 may set the mode signal to the inactive state (disabling pulse skipping). Additionally or alternatively, the mode determination module 638 may also generate the mode signal according to the commanded speed $\omega_r$. The mode determination module 638 may also generate the mode signal according to other operating parameters, such as motor currents, load, and/or torque.

The pulse skip determination module 634 selectively generates a pulse skip signal, which controls the multiplexers 630 of the duty cycle adjustment module 626. The pulse skip signal determines whether the multiplexers pass the commanded duty cycles through or select a predetermined value (such as 0%, as shown in FIG. 6A). Although shown as a single pulse skip signal, in other implementations each of the multiplexers 630 could be individually controlled with a respective pulse skip signal.

When the mode signal is in the inactive state (pulse skipping disabled), the pulse skip determination module 634 leaves the pulse skip signal in an inactive state, which causes the multiplexers 630 to pass the commanded duty cycles through unchanged. When the mode signal is in the active state (pulse skipping enabled), the pulse skip determination module 634 alternates the pulse skip signal between the active state and the inactive state according to one of the techniques described below. In the active state, the pulse skip signal causes the multiplexers 630 to pass through the predetermined value (e.g., 0%) instead of the commanded duty cycles.

The outputs of the multiplexers 630 are provided to first, second, and third pulse modules 642, 644, and 648, respectively. The pulse modules 642, 644, and 648 output signals using pulse-width modulation (PWM) having duty cycles specified by the outputs of the multiplexers 630. When the pulse skip signal is in the inactive state, the first, second, and third pulse modules 642, 644, and 648 generate PWM signals according to the commanded duty cycles A, B, and C, respectively.

In various implementations, the first, second, and third pulse modules 642, 644, and 648 are capable of varying the width of each pulse in response to the incoming duty cycle commands. In other words, for every period of the PWM waveform, the duty cycle of the PWM pulse will be based on the present duty cycle command, and the duty cycle commands can change once each period. When a 0% duty cycle is requested, no pulse is created during that period, and the pulse is considered to be "skipped." By skipping the pulse, switching losses in the inverter power module 208 may be reduced.

The pulse skip determination module 634 may therefore vary the state of the pulse skip signal for each period of the PWM. PWM periods where the pulse skip signal is active are called skipped pulses, because a 0% duty cycle causes there to be no voltage change in the PWM signal. The pulse skip determination module 634 may determine which pulses to skip according to, for example, a predetermined pulse skip sequence and/or a pulse skip sequence generated on the fly.

For example, the predetermined pulse skip sequence can define which pulses to skip and, when the predetermined pulse skip sequence is a finite length, the predetermined pulse skip sequence can be repeated over and over again. The predetermined pulse skip sequence may specify that, for example only, every other pulse is skipped or every fourth pulse is skipped. The predetermined pulse skip sequence may be more complicated, and may include a binary sequence with each binary digit indicating whether the corresponding pulse should be skipped or not. Alternatively, the predetermined pulse skip sequence may include a series of integers, each integer specifying how many pulses to allow before skipping a pulse.

In various implementations, the pulse skip determination module 634 may implement a lookup table from which a pulse skip sequence is selected. The lookup table may store pulse skip sequences corresponding to different operating regimes of the motor 400 or of the motor control module 260. For example, different pulse skip sequences may be selected from the lookup table based on a speed of the motor 400.

Predetermined pulse skip sequences may be generated at design time using a pseudorandom number generator. If the predefined pulse skip sequence is long enough, it can be simply be repeated over and over again to achieve results insignificantly different from a truly random sequence. Alternatively, the pulse skip determination module 634 may implement a pseudorandom number generator to allow a randomized pulse skip sequence to be created on the fly. The pseudorandom number sequence may be, for example, uniformly distributed or normally distributed. In various implementations, the pseudorandom number sequence may be generated without replacement—that is, each value is used exactly once before the sequence repeats.

For example, the pulse skip determination module 634 may randomly select an integer from a set such as the inclusive set [0, 1, 2]. The integer determines how many pulses will be skipped—i.e., a value of 0 means that the next pulse will not be skipped. A value of 1 means that the next pulse will be skipped, and a value of 2 means that the next two pulses will be skipped. The set may include additional integers greater than 2 and may omit certain integers. For example only, the set of integers may consist of even values, including zero. In an alternative example, the set of integers may consist of zero as well as one or more odd values.

Because each phase of the inverter power module 208 includes complementary switches, complementary versions of the outputs of the pulse modules 642, 644, and 648 are generated by inverters 652, 656, and 660, respectively. If the complementary switches in a given inverter phase were controlled with strictly complementary control signals, there may be some overlap between one switch turning off and the other switch turning on. When both switches are on, an undesirable short circuit current may flow. Therefore, a deadtime module 664 offsets the switching-on time of one signal from the switching-off time of the other control signal.

For example only, the deadtime module 664 may slightly advance an off-going (active to inactive) control signal and slightly delay an on-coming (inactive to active) control signal. In this way, any overlap between the conducting times of the complementary switches is avoided. Outputs of the deadtime module 664 are provided to the switches of the inverter power module 208.

In various implementations, the order of the deadtime module 664, the pulse modules 642, 644, and 648, and the duty cycle adjustment module 626 may be rearranged. For example only, the deadtime module 664 may be arranged after the pulse modules 642, 644, and 648 but before the duty cycle adjustment module 626. In such an implementation, the duty cycle adjustment module 626 would simply, in response to the pulse skip signal indicating that a pulse should be skipped, replace the six deadtime-adjusted pulses with an inactive signal (such as 0 in an active-high environment).

Figure 6B:
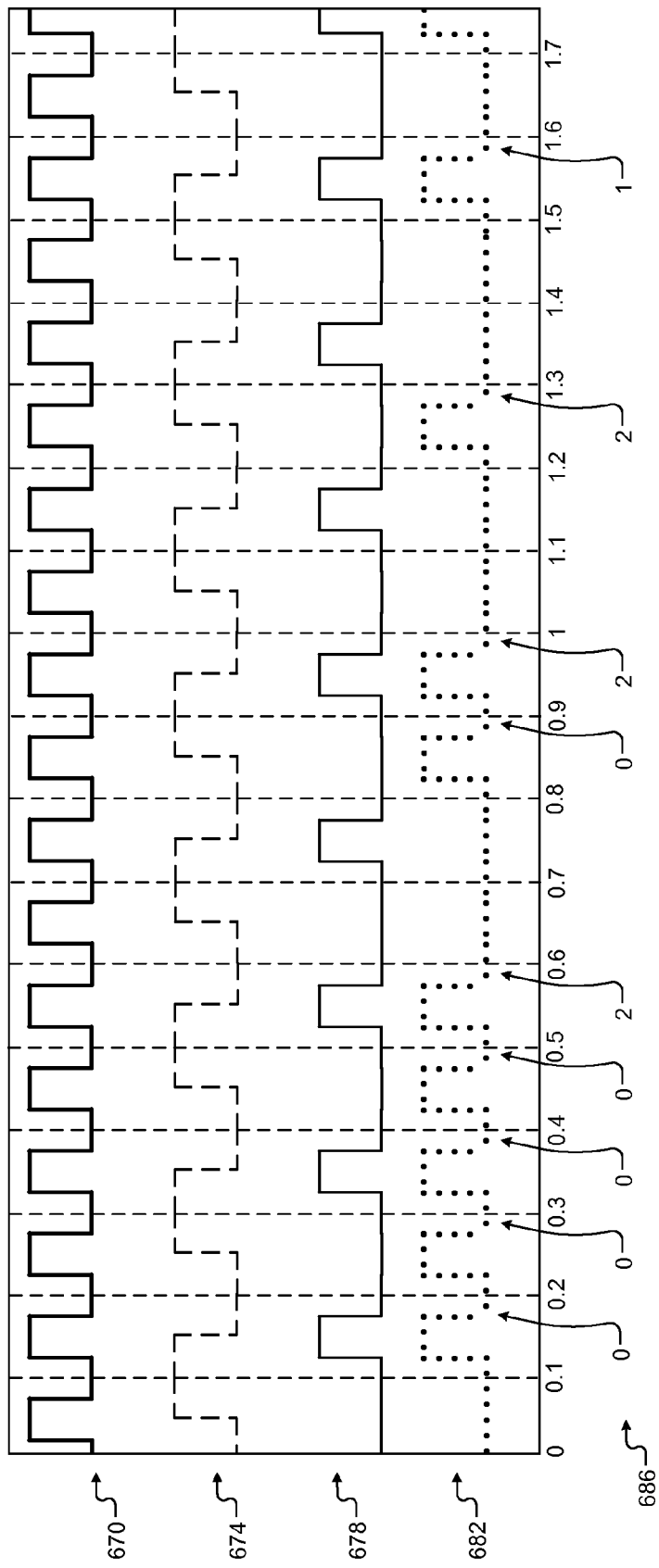
FIG. 6B is a chart showing traces of example pulse-width modulated signals.

Referring now to FIG. 6B, traces of four example pulse-width modulation (PWM) signals are shown, with a timescale in milliseconds along the x axis. A first PWM signal 670 has a switching frequency of 10 kHz and a duty cycle of 50%. Although 10 kHz is used in these examples, higher or lower switching frequencies may be used. In various implementations, motor currents are read while the first PWM signal 670 is low. These reading times are marked with vertical dashed lines. These motor currents may be used in closed-loop motor control.

To reduce switching losses, a PWM signal having a lower switching frequency can be used. For example only, a second PWM signal 674 is shown, with a 5 kHz switching frequency. The switching frequency is reduced by half, so the switching losses (caused by the low-to-high and high-to-low signal transitions) are reduced by approximately half. However, an audible signature of the 5 kHz switching may be less pleasing to the human ear than an audible signature of the 10 kHz switching. In addition, in some implementations, motor currents are not measurable while the PWM signal is high. In those implementations, the second PWM signal 674 only allows current readings to be performed half as often as for the first PWM signal 670. This may decrease the responsiveness of closed-loop control.

A third PWM signal 678 is shown, which may allow for current readings at every reading time. The third PWM signal 678 can be thought of as a 5 kHz PWM signal operating at 25% duty cycle or equivalently as a 10 kHz PWM signal with every other pulse skipped. The switching losses are therefore reduced similarly to the second PWM signal 674. However, there may still be an unpleasant audible signature to the third PWM signal 678 similar to that of the second PWM signal 674.

A fourth PWM signal 682 operates at 10 kHz, as with the first PWM signal 670, but skips individual PWM cycles. If these PWM cycles are skipped in an aperiodic manner, the resulting audible signature is decreased, as the energy of the PWM switching is no longer concentrated at 5 kHz.

In various implementations, after each pulse is generated, a random number is generated. That number of pulses is then skipped. In such implementations, the fourth PWM signal 682 would have resulted in response to a series of random numbers 686 having been generated as shown. Note that after a generation of the number 0, no pulses are skipped, and the pulses are consecutive. After generation of the number 1, a single pulse is skipped. Similarly, after generation of the number 2, two pulses are skipped.

Referring now to FIG. 7, a functional block diagram of an example implementation of the open-loop torque module 511 is shown. The open-loop torque module 511 generates an open-loop demanded torque, which may be limited according to the DC bus voltage and a device temperature. The open-loop torque module 511 includes a torque limit determination module 704, an open-loop torque determination module 708, and a torque limiting module 712.

The open-loop torque determination module 708 determines a demanded torque suitable for starting the motor 400 in open-loop mode. The demanded torque may be a single predetermined value. In other implementations, the open-loop torque may be one of a plurality of values stored in a lookup table.

The torque limit determination module 704 determines an upper torque limit based on the DC bus voltage and a temperature of the switch block 402 of FIGS. 3A-3C (referred to as switch block temperature). For example only, the torque limit determination module 704 receives the switch block temperature from a temperature sensor (not shown) arranged to determine the temperature of the switch block 402. In various implementations, the switch block temperature may be determined by combining temperature values from multiple temperature sensors. Each of the temperature sensors may be thermally coupled to a different circuit element. For example only, each temperature sensor may be thermally coupled to a respective switching module that includes two of the transistors and two of the diodes of the switch block 402. The individual temperature values may be combined by averaging. Alternatively, a maximum value of the individual temperature values may be chosen.

For example only, the upper torque limit may be calculated using a function of the DC bus voltage and the switch block temperature. Additionally or alternatively, the upper torque limit may be determined from a lookup table indexed by the DC bus voltage and the switch block temperature.

The torque limiting module 712 generates a limited demanded torque by limiting the demanded torque according to the upper torque limit. In other words, the torque limiting module 712 outputs, as the limited demanded torque, the lesser of the demanded torque and the upper torque limit.

Figure 8A:
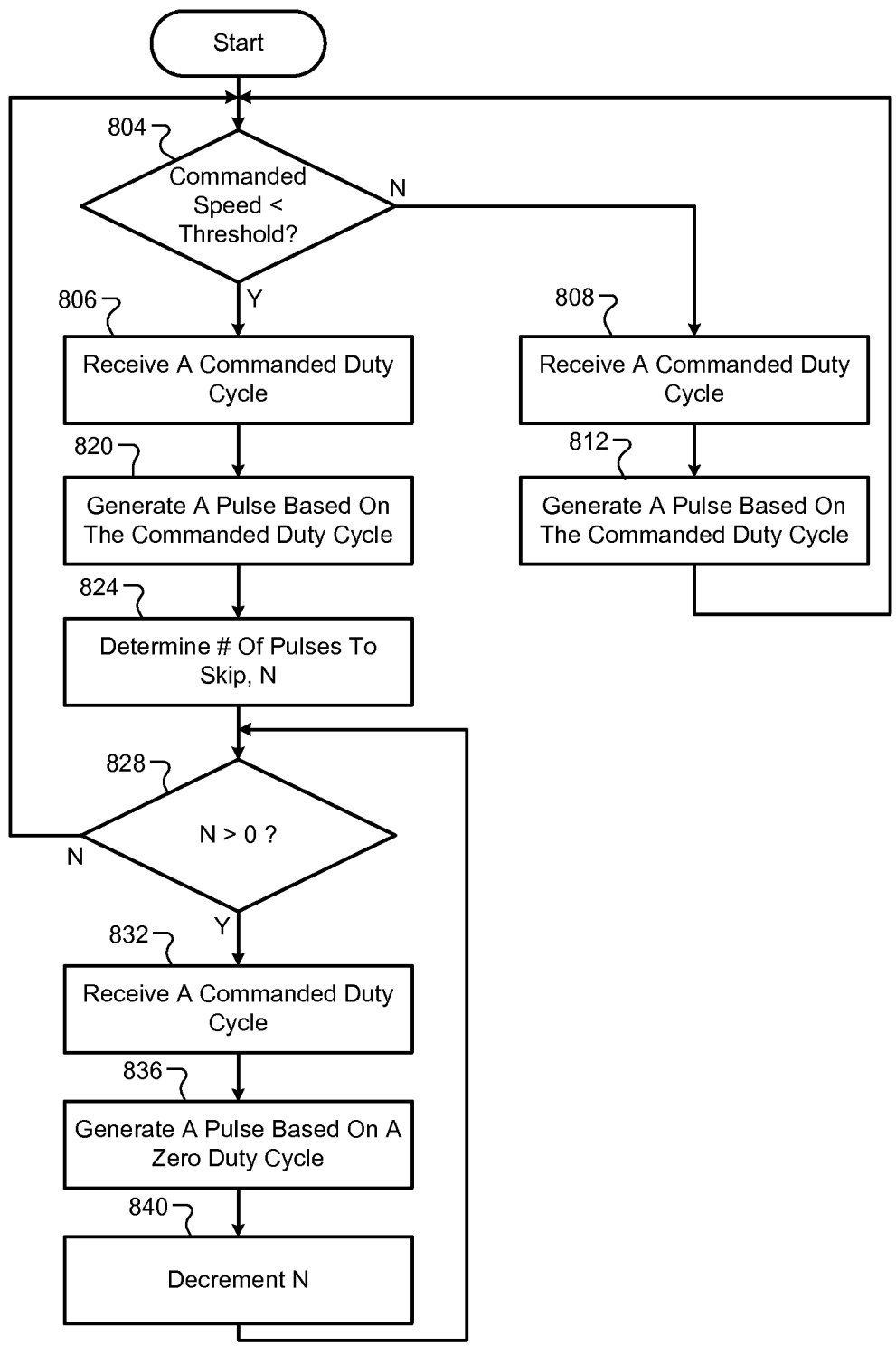
FIG. 8A-8B are flow diagrams of example methods for PWM pulse skipping.

Referring now to FIG. 8A, an example of PWM motor control is shown. At 804, control determines whether a commanded motor speed is less than a predetermined threshold speed. If so, control continues at 806; otherwise, control continues at 808. At 808, control receives a commanded duty cycle. At 812, control generates a pulse based on the commanded duty cycle and continues at 804.

At 806, control receives a commanded duty cycle. At 820, control generates a pulse based on the commanded duty cycle. At 824, control determines a number, N, of pulses to skip. At 828, control determines whether N is greater than zero. If so, control continues at 832; otherwise, control returns to 804. In various implementations, the commanded speed is checked again between 828 and 832; if the commanded speed is no longer less than the threshold, control transfers to 808 and otherwise, control continues at 832. At 832, control receives a commanded duty cycle. At 836, control generates a pulse based on a zero duty cycle—in other words, skipping the pulse. At 840, control decrements N. Control continues at 828.

Figure 8B:
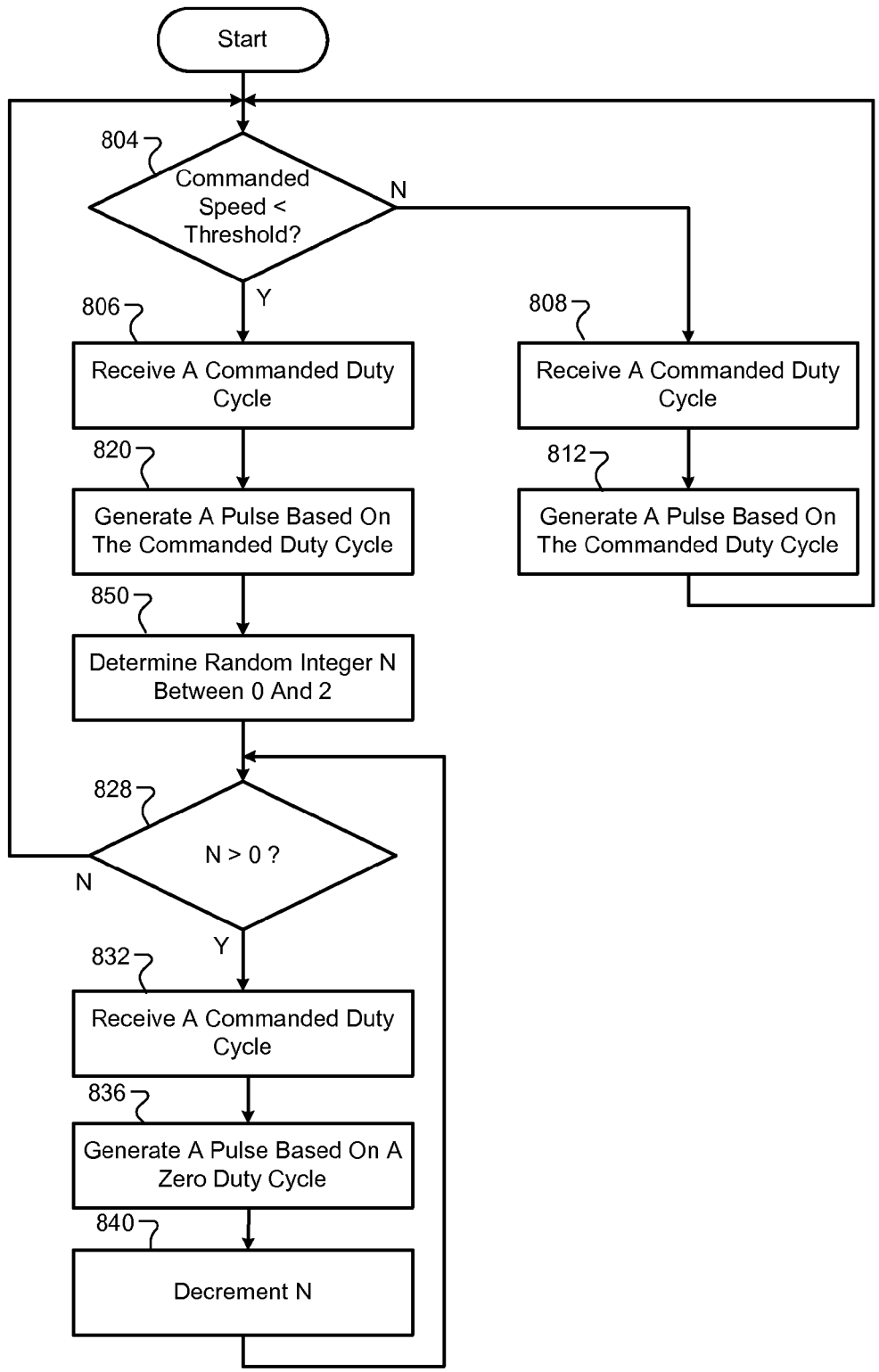

Referring now to FIG. 8B, an alternative example of PWM motor control is shown. Reference numerals from FIG. 8A are used to indicate similar elements. After 820, control continues at 850. At 850, control determines a random integer between zero and two, and sets N equal to the random integer. Control then continues at 828.

Figure 9:
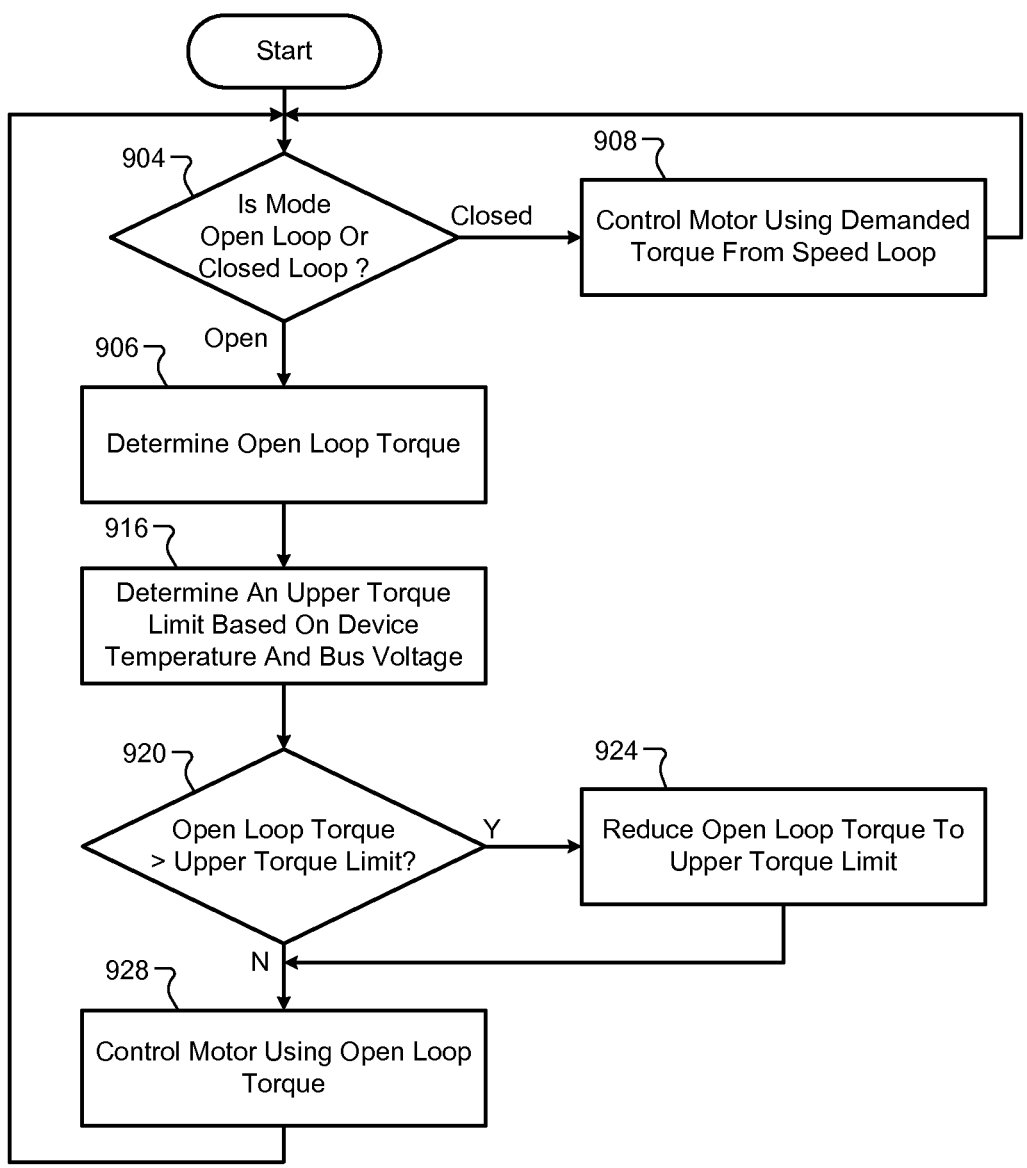
FIG. 9 is a flow diagram of an example method for open-loop torque control.

Referring now to FIG. 9, control related to producing a limited demanded torque begins at 900. At 904, control determines whether the mode is open-loop or closed-loop. If open-loop, control continues at 906. If closed-loop, control continues at 908. At 908, control controls the motor using the demanded torque from the speed loop and returns to 904.

At 906, control determines an open-loop torque. At 916, control determines an upper torque limit based on a device temperature, such as a switch block temperature, and a bus voltage. At 920, control determines whether the open-loop torque is greater than the upper torque limit. If so, control continues at 924; otherwise, control continues at 928. At 924, control reduces the open-loop torque to the upper torque limit. Control continues at 928. At 928, control controls the motor using the open-loop torque and returns to 904.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A control system for a motor, the control system comprising:
    a pulse-width modulation module that generates three duty cycle values based respectively on three voltage requests and based on a bus voltage;
    a mode determination module that selectively enables a pulse skipping mode based on a speed of the motor;
    a pulse skip determination module that, in response to the pulse skipping mode being enabled, serially generates pulse skipping numbers, wherein the pulse skipping numbers are selected randomly from a group consisting of zero, one, and two;
    a duty cycle adjustment module that, for each switching period of a plurality of switching periods, selectively sets the three duty cycle values to a zero value in response to a corresponding one of the pulse skipping numbers being nonzero;
    a pulse module that, for each of the switching periods, generates three pulse waveforms in response to the three duty cycle values as modified by the duty cycle adjustment module; and
    an inverter power module that controls three phases of the motor based on the three pulse waveforms, respectively.

2. A control system for a motor, the control system comprising:
    a pulse-width modulation module that generates three duty cycle values based on three voltage requests, respectively, wherein a plurality of solid-state switches control three phases of the motor in response to the three duty cycle values, respectively;
    a pulse skip determination module that generates a pulse skip signal; and
    a duty cycle adjustment module that selectively prevents the plurality of solid-state switches from switching during intervals specified by the pulse skip signal.

3. The control system of claim 2 wherein the pulse-width modulation module generates each of the three duty cycle values based on a ratio of each of the three voltage requests, respectively, to a voltage of a bus, wherein the bus provides power to the motor via the plurality of solid-state switches.

4. The control system of claim 2 further comprising a mode determination module that generates a mode signal in response to at least one motor operating parameter, wherein in response to the mode signal being in a first state, the duty cycle adjustment module prevents the plurality of solid-state switches from switching during intervals specified by the pulse skip signal.

5. The control system of claim 4 wherein the motor operating parameter is a speed of the motor, and wherein the mode determination module sets the mode signal to the first state in response to the speed of the motor being less than a predetermined threshold.

6. The control system of claim 2 further comprising a pulse module that generates three pulse waveforms using duty cycles set by the three duty cycle values, respectively, wherein the plurality of solid-state switches are controlled based on the three pulse waveforms.

7. The control system of claim 6 wherein the duty cycle adjustment module selectively prevents the plurality of solid-state switches from switching by causing the pulse module to generate the three pulse waveforms using duty cycles of 0%.

8. The control system of claim 2 wherein the pulse skip determination module generates the pulse skip signal based on a series of integer values, wherein the duty cycle adjustment module prevents the plurality of solid-state switches from switching in response to the pulse skip signal having a first state.

9. The control system of claim 8 wherein the pulse skip determination module generates the pulse skip signal having the first state in response to a present one of the series of integer values being nonzero.

10. The control system of claim 8 wherein the series of integer values is a predetermined sequence.

11. The control system of claim 8 further comprising a random number generator that generates the series of integer values.

12. A method of controlling a motor, the method comprising:
generating three duty cycle values based on three voltage requests, respectively, wherein a plurality of solid-state switches control three phases of the motor in response to the three duty cycle values, respectively;
generating a pulse skip signal; and
selectively preventing the plurality of solid-state switches from switching during intervals specified by the pulse skip signal.

13. The method of claim 12 further comprising generating each of the three duty cycle values based on a ratio of each of the three voltage requests, respectively, to a voltage of a bus, wherein the bus provides power to the motor via the plurality of solid-state switches.

14. The method of claim 12 further comprising:
generating a mode signal in response to at least one motor operating parameter; and
in response to the mode signal being in a first state, preventing the plurality of solid-state switches from switching during intervals specified by the pulse skip signal.

15. The method of claim 14 wherein the motor operating parameter is a speed of the motor, and further comprising setting the mode signal to the first state in response to the speed of the motor being less than a predetermined threshold.

16. The method of claim 12 further comprising generating three pulse waveforms using duty cycles set by the three duty cycle values, respectively, wherein the plurality of solid-state switches are controlled based on the three pulse waveforms.

17. The method of claim 16 wherein the selectively preventing the plurality of solid-state switches from switching is performed by causing the three pulse waveforms to be generated using duty cycles of 0%.

18. The method of claim 12 further comprising:
generating the pulse skip signal based on a series of integer values; and
preventing the plurality of solid-state switches from switching in response to the pulse skip signal having a first state.

19. The method of claim 18 further comprising generating the pulse skip signal having the first state in response to a present one of the series of integer values being nonzero.

20. The method of claim 18 wherein the series of integer values is a predetermined sequence.

21. The method of claim 18 further comprising randomly generating the series of integer values.

* * * * *